(12) United States Patent
Wei

(10) Patent No.: US 9,781,746 B2
(45) Date of Patent: Oct. 3, 2017

(54) COMMUNICATION SYSTEM FOR SUPPORTING CARRIER AGGREGATION AND METHOD AND APPARATUS FOR UPDATING SYSTEM INFORMATION THEREOF

(71) Applicant: Sony Corporation, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 369 days.

(21) Appl. No.: 14/524,364

(22) Filed: Oct. 27, 2014

(65) Prior Publication Data

US 2015/0063263 A1 Mar. 5, 2015

Related U.S. Application Data

(60) Continuation of application No. 14/286,111, filed on May 23, 2014, now Pat. No. 8,929,906, which is a
(Continued)

(30) Foreign Application Priority Data

Jan. 8, 2010 (CN) .......................... 2010 1 0002920

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0028* (2013.01); *H04L 5/0032* (2013.01);
(Continued)

(58) Field of Classification Search
CPC ............. H04W 48/08; H04W 74/0833; H04W 72/0486; H04L 5/0028; H04L 5/0032
See application file for complete search history.

(56) References Cited

U.S. PATENT DOCUMENTS

2007/0242600 A1 10/2007 Li et al.
2009/0316659 A1 12/2009 Lindoff et al.
(Continued)

FOREIGN PATENT DOCUMENTS

CN 101404539 4/2009
CN 101541029 9/2009
(Continued)

OTHER PUBLICATIONS

3GPP ETSI TS 136 331, V8.5,0, "LTE ;Evolved Universal Terrestrial Radio Access (E-UTRA); Radio Resource Control (RRC); Protocol specification," Total 205 pages, (Apr. 2009).
(Continued)

*Primary Examiner* — Redentor Pasia
(74) *Attorney, Agent, or Firm* — Oblon, McClelland, Maier & Neustadt, L.L.P.

(57) ABSTRACT

A communication system for supporting carrier aggregation and a method and apparatus for updating system information thereof are disclosed. A method for providing system information in the communication system supporting carrier aggregation includes: when system information of said communication system changes, generating first information including information for indicating the change of system information; determining a first cell of a terminal related to the change of system information, wherein said first cell is one of cells to which said terminal connects, and corresponds to a carrier unit currently used by said terminal for keeping connection with a base station of said communication system; and transmitting said first information to said terminal through said first cell.

18 Claims, 14 Drawing Sheets

Related U.S. Application Data division of application No. 13/690,938, filed on Nov. 30, 2012, now Pat. No. 8,825,068, which is a division of application No. 13/515,328, filed as application No. PCT/CN2011/070043 on Jan. 5, 2011, now Pat. No. 8,526,964.

(51) Int. Cl.
*H04L 5/00* (2006.01)
*H04W 48/08* (2009.01)
*H04W 48/12* (2009.01)
*H04W 24/02* (2009.01)

(52) U.S. Cl.
CPC ......... *H04W 48/08* (2013.01); *H04W 72/042* (2013.01); *H04W 72/0486* (2013.01); *H04W 24/02* (2013.01); *H04W 48/12* (2013.01)

(56) References Cited

U.S. PATENT DOCUMENTS

| | | | | |
|---|---|---|---|---|
| 2010/0296389 A1* | 11/2010 | Khandekar | ........... | H04L 5/0007 370/216 |
| 2010/0303039 A1* | 12/2010 | Zhang | ........... | H04L 5/0035 370/331 |
| 2011/0081898 A1* | 4/2011 | Park | ........... | H04L 5/0007 455/418 |
| 2011/0103243 A1* | 5/2011 | Larsson | ........... | H04L 5/001 370/252 |
| 2011/0103331 A1* | 5/2011 | Kuo | ........... | H04L 5/001 370/329 |

FOREIGN PATENT DOCUMENTS

| | | |
|---|---|---|
| CN | 101594683 | 12/2009 |
| CN | 101616484 | 12/2009 |
| KR | 10-2007-0118738 | 12/2007 |
| WO | WO 2006/109161 A2 | 10/2006 |
| WO | WO 2009/112928 A2 | 9/2009 |

OTHER PUBLICATIONS

International Search Report Issued Apr. 7, 2011 in PCT/CN11/070043 Filed Jan. 5, 2011.
"System Information Acquisition and Updating in Carrier Aggregation", CATT, 3GPP TSG RAN WG2 meeting #67bis, R2-095487, Oct. 12-16, 2009, pp. 1-3.
"System Information Acquisition and Updating in Carrier Aggregation", CATT, 3GPP TSG RAN WG2 meeting #68, R2-096503, Nov. 9-13, 2009, pp. 1-4.
"System information related open issues", Huawei, 3GPP TSG-RAN WG2 meeting #68, R2-096494, Nov. 9-13, 2009, pp. 1-5.
"System information acquisition at the start of carrier aggregation", Panasonic, 3GPP TSG RAN WG2#68, R2-096489, Nov. 9-13, 2009, 3 pages.
"System Information Acquisition and updating for Carrier Aggregation", ZTE, 3GPP TSG RAN WG2 #67, R2-094710, Aug. 24-28, 2009, pp. 1-2.
"Performance Evaluation of MIMO-related Dedicated Control Signaling", LG Electronics, 3GPP TSG RAN WG1 meeting #49bis, R1-072885, Jun. 25-29, 2007, pp. 1-5.
"System Information Acquisition for Carrier Aggregation", Research in Motion, UK Limited, 3GPP TSG RAN WG2 Meeting #68, R2-096885, Nov. 9-13, 2009, pp. 1-4.
"Provisioning System Information for component carriers", Ericsson, ST-Ericsson, 3GPP TSG-RAN WG2 #68, R2-096757, Oct. 9-13, 2009, pp. 1-3.
Takehiro Nakamura, "LTE Rel-9 and LTE-Advanced in 3GPP", NTT Docomo, Inc., LTE Asia, Sep. 8, 2009, pp. 1-28.
Stefan Parkvall, et al., "LTE-Advanced—Evolving LTE towards IMT—Advanced", IEEE, 2008, pp. 1-5.
"System information acquisition for carrier aggregation", Research in Motion UK Limited, 3GPP TSG RAN WG2 Meeting #67bis, R2-095831, Oct. 16, 2009, pp. 1-4.

* cited by examiner

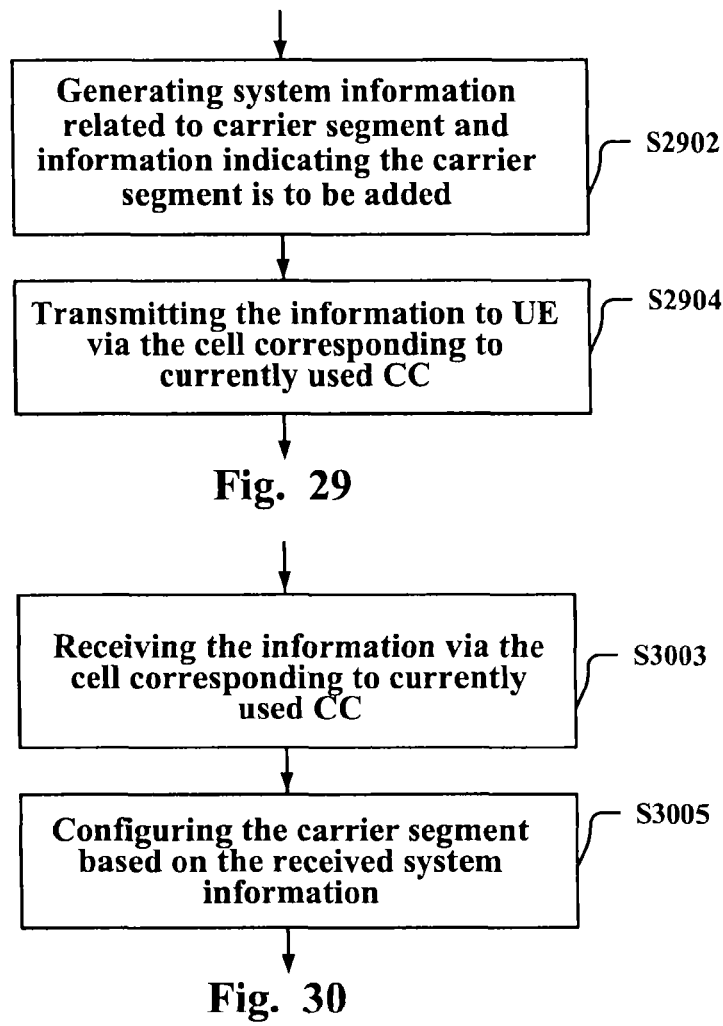
Fig. 29
Fig. 30
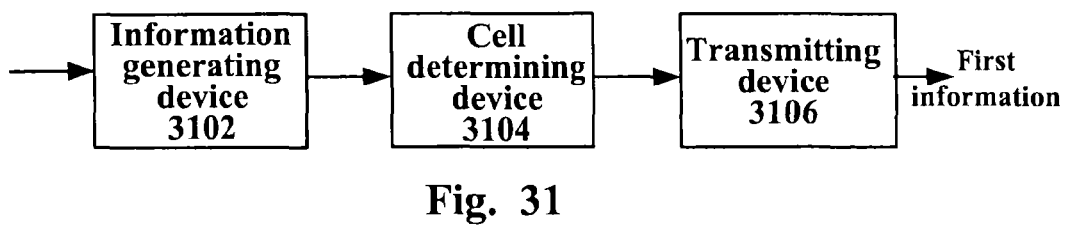
Fig. 31
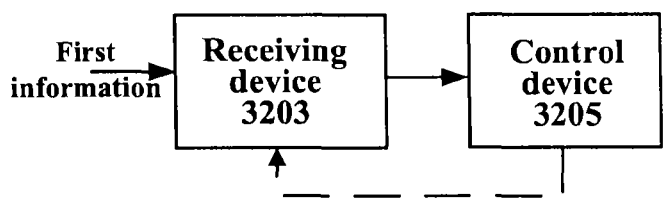
Fig. 32

COMMUNICATION SYSTEM FOR SUPPORTING CARRIER AGGREGATION AND METHOD AND APPARATUS FOR UPDATING SYSTEM INFORMATION THEREOF

CROSS-REFERENCE TO RELATED APPLICATIONS

This application is a continuation of U.S. application Ser. No. 14/286,111, filed May 23, 2014, which is a divisional of U.S. application Ser. No. 13/690,938, filed Nov. 30, 2012, which is a divisional of U.S. application Ser. No. 13/515,328, filed Jun. 12, 2012, which is a National Stage Application of PCT/CN11/070,043, filed Jan. 5, 2012, which is based upon and claims the benefit of priority from prior Chinese Patent Application No. 201010002920.9, filed Jan. 8, 2010. U.S. application Ser. No. 13/515,328 is incorporated herein by reference.

FIELD

The disclosure relates to the field of carrier aggregation supporting communications, and particularly, to a communication system supporting carrier aggregation and methods and apparatuses for updating the system information thereof. More particularly, the disclosure relates to methods and apparatuses for providing and receiving system information in a communication system supporting carrier aggregation and communication system including such apparatuses.

BACKGROUND

Future LTE-A (Long Term Evolution-Advanced) system can support a transmission bandwidth up to 100 MHz, while in LTE standard the largest supportable transmission bandwidth is 20 MHz. Therefore, it is desired to aggregate multiple component carriers to meet the higher requirements for transmission bandwidth in LTE-A system. Carrier aggregation is a technique proposed by 3GPP in which multiple component carriers are aggregated for transmission, in order to support the higher requirements for transmission bandwidth in future mobile communication system. The introduction of carrier aggregation brings about a new opportunity and challenge in the development of communication technology.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the disclosure, a method of providing system information in a communication system supporting carrier aggregation is provided, which includes: generating, when there is a change in system information of the communication system, first information which includes information indicating the change in system information; determining a first cell of a user equipment involved in the change in system information, wherein the first cell is one of cells to which the user equipment is connected and corresponds to a component carrier which is being used by the user equipment and is kept in connection with a base station of the communication system; and transmitting the first information to the user equipment via the first cell.

According to another aspect of the disclosure, an apparatus of providing system information in a communication system supporting carrier aggregation is provided, which includes: an information generating device, configured to generate, when there is a change in system information of the communication system, first information which includes information indicating that there is a change in system information; a cell determining device, configured to determine a first cell of a user equipment involved in the change in system information, wherein the first cell is one of cells to which the user equipment is connected and corresponds to a component carrier which is being used by the user equipment and is kept in connection with a base station of the communication system; and a transmitting device, configured to transmit the first information to the user equipment via the first cell.

According to another aspect of the disclosure, a method of receiving system information in a communication system supporting carrier aggregation is provided, which includes: receiving first information which includes information indicating that there is a change in system information of the communication system via a first cell corresponding to a component carrier which is being used by a user equipment of the communication system and is kept in connection with a base station of the communication system; and parsing the first information, to obtain the information indicating that there is the change in system information.

According to another aspect of the disclosure, an apparatus of receiving system information in a communication system supporting carrier aggregation is provided, which includes: a receiving device, configured to receive first information which includes information indicating that there is a change in system information of the communication system via a first cell corresponding to a component carrier which is being used by the apparatus and is kept in connection with a base station of the communication system; and a control device, configured to parse the first information, to obtain the information indicating that there is the change in system information.

According to another aspect of the disclosure, a method of providing and receiving system information in a communication system supporting carrier aggregation is provided, which includes: generating, when there is a change in system information of the communication system, first information which includes information indicating that there is the change in system information; determining a first cell of a user equipment involved in the change in system information, wherein the first cell is one of cells to which the user equipment is connected and corresponds to a component carrier which is being used by the user equipment and is kept in connection with a base station of the communication system; transmitting the first information to the user equipment via the first cell; receiving by the user equipment the first information via the first cell; and parsing by the user equipment the first information, to obtain the information indicating that there is the change in system information.

According to another aspect of the disclosure, a communication system is provided, which supports carrier aggregation and includes a first apparatus of providing system information and a second apparatus of receiving the system information. The first apparatus includes: an information generating device, configured to generate, when there is a change in system information of the communication system, first information which comprises information indicating that there is a change in system information; a cell determining device, configured to determine a first cell of a user equipment involved in the change in system information, wherein the first cell is one of cells to which the user equipment is connected and corresponds to a component carrier which is being used by the user equipment and is kept in connection with a base station of the communication system; and a transmitting device, configured to transmit the first information to the user equipment via the first cell. The second apparatus includes: a receiving device, configured to receive first information which includes information indicating that there is a change in system information of the communication system via a first cell corresponding to a component carrier which is being used by the apparatus and is kept in connection with a base station of the communication system; and a control device, configured to parse the first information, to obtain the information indicating that there is a change in system information.

In addition, an embodiment of the invention provides computer program for realizing the above method.

Furthermore, an embodiment of the disclosure provides a computer program product in the form of computer readable medium on which there are recorded computer program codes for the above method.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings:

FIG. 29 is a schematic flow chart illustrating a method of providing system information related to a carrier segment when the carrier segment is to be added for a currently used component carrier according to another embodiment of the disclosure;

FIG. 30 is a schematic flow chart illustrating a method of receiving system information related to a carrier segment when the carrier segment is to be added for a currently used component carrier, corresponding to the providing method shown in FIG. 29;

FIG. 31 is a schematic block diagram illustrating an apparatus of providing system information in a CA-S communication system according to an embodiment of the disclosure;

FIG. 32 is a schematic block diagram illustrating an apparatus of receiving system information in a CA-S communication system according to an embodiment of the disclosure;

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Some embodiments of the disclosure provide methods and apparatus of updating system information in a CA-S communication system as well as a communication system including the above apparatus.

Figure 1:
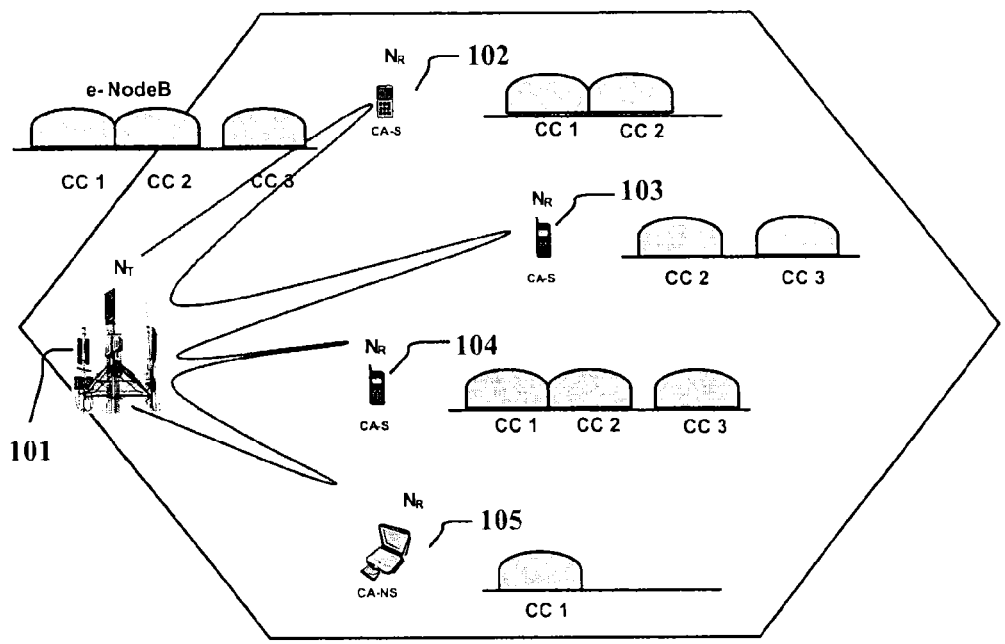
FIG. 1 is a schematic diagram illustrating the structure of a communication system supporting carrier aggregation.

FIG. 1 shows an example of a CA-S communication system. As shown in FIG. 1, the communication system includes a base station (e.g. e-NodeB) 101 and user equipments 102, 103, and 104. In the example of FIG. 1, the component carriers supported by the communication system include CC1, CC2 and CC3. The user equipment 102 can use the component carriers CC1 and CC2, the user equipment 103 supports the component carriers CC2 and CC3, and the user equipment 104 supports the component carriers CC1, CC2 and CC3. That is, the user equipments 102, 103 and 104 each are a carrier aggregation supporting (CA-S) user equipment. As an example, the communication system may further include a carrier aggregation non-supporting (CA-NS) user equipment 105. As shown in FIG. 1, the user equipment 105 can use only a component carrier, i.e. CC1. Among the component carriers supported by the communication system, the component carrier CC1 is contiguous with the component carrier CC2, while the component carrier CC3 is not contiguous with the component carriers CC1 and CC2. The communication system as shown in FIG. 1 not only includes CA-S user equipments, but also includes CA-NS user equipments. It should be noted that this is merely an example and the disclosure should not be limited to such communication system. For example, the disclosure may be applied to a communication system including only a base station and a CA-S user equipment; a communication system including a base station, a relay station and a user equipment or other CA-S communication system, the description of which is not detailed herein.

It should be noted that the so called "User Equipment (UE)" or "Equipment" in the disclosure may include but not limited to a mobile device used by a user to access a communication network, such as a mobile phone (e.g. 102 and 103 shown in FIG. 1), a personal digital assistance or a portable personal computer, or the like.

The system information of a communication system needs to be kept newest at all times. When the system information changes, the main node (e.g. the base station) of the communication system needs to notify the user equipments in some way. In a CA-S communication system, a user equipment may communicate with the main node of the communication system via multiple of component carriers. For example, the equipment 104 shown in FIG. 1 may communicate with the base station via 3 component carriers CC 1, CC2, and CC3. Different components may have different coverage due to their different propagation characteristics. When a user equipment moves out of the coverage of a component carrier it supported and just at this time the system information needs to be updated, if the updated information is transmitted to this user equipment via the cell corresponding to this component carrier, the user equipment can not receive the information. Thus, when the user equipment moves back to the coverage of this component carrier, this component carrier will be unusable due to the incorrect system information.

Figure 2:
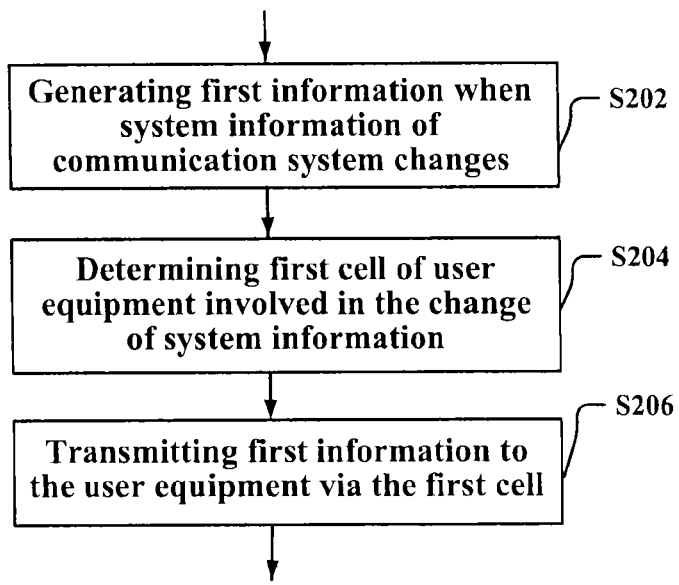
FIG. 2 is a schematic flow chart illustrating a method of updating system information by providing information to a user equipment under the carrier aggregation (CA) supporting scenario according to an embodiment of the disclosure.

FIG. 2 shows a flow chart of a method of updating system information by providing information to a user equipment under the CA scenario according to an embodiment of the disclosure.

As shown in FIG. 2, the method includes steps S202, S204 and S206.

In step S202, when the system information of the communication system changes, the information for indicating the change of the system information is generated. In the following the information generated in this step is referred to as the first information for conciseness.

The communication system herein is a CA-S communication system, such as the communication system shown in FIG. 1. Whether the system information of the communication system changes or not may be judged by the main node (For example, the base station) in the communication system. For example, related information may be obtained from the corresponding configuration file of the main node (the base station), to determine whether the system information changes.

In step S204, the cell to be used for transmitting the first information to a user equipment involved in the change of the system information is determined.

As described above, in a CA-S communication system, a user equipment may communicate with the main node via a plurality of component carriers. Each of the component carriers correspond to a cell. Among the cells to which each user equipment is connected, there exists a special cell which may be used to provide security input and non access stratum (NAS) mobility information, etc. The special cell corresponds to a component carrier which is being used by the user equipment for keeping connection with the main node (e.g. the base station) in the communication system. As an example, only one special cell can be configured for each user equipment. In other words, the following definition may be made: each user equipment is connected to one special cell which corresponds to a component carrier keeping connection with the base station, while other component carriers supported by this user equipment can be used as the uplink and/or downlink resources of this user equipment. In an example, the cells corresponding to these other component carriers are also called as serving cells.

Figure 3:
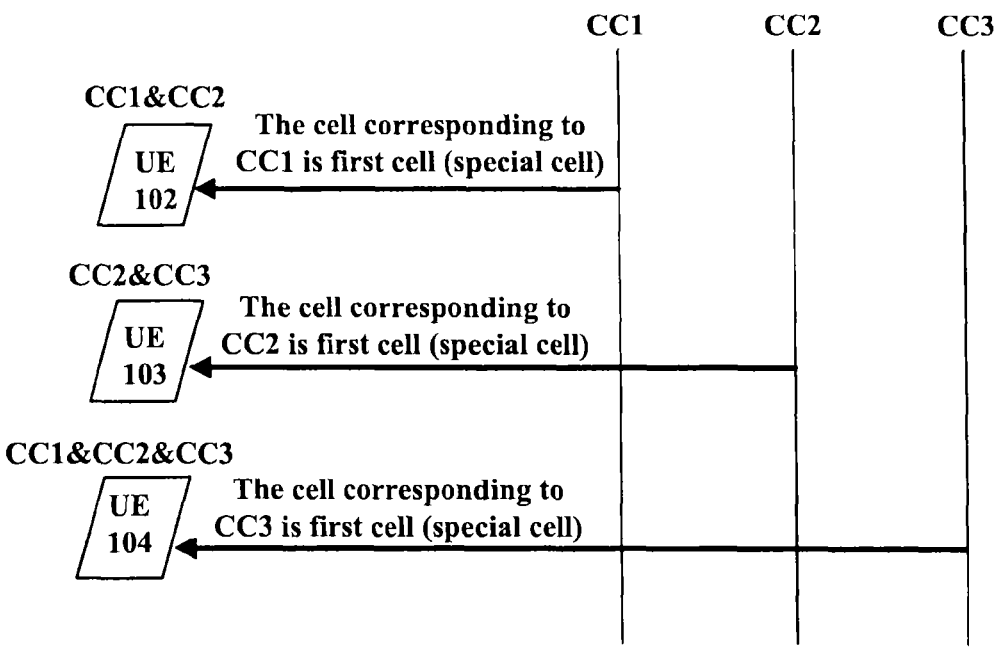
FIG. 3 is a schematic diagram illustrating special cells of some user equipment in the communication system shown in FIG. 1.

FIG. 3 shows the special cells of some user equipments in the communication system shown in FIG. 1. As shown in FIG. 3, the user equipment 102 (UE 102) supports component carriers CC1 and CC2, wherein the cell corresponding to CC1 is the special cell of the user equipment 102. The user equipment 103 (UE 103) supports component carriers CC2 and CC3, wherein the cell corresponding to CC2 is the special cell of the user equipment 103. The user equipment 104 (UE 104) supports component carriers CC1, CC2 and CC3, wherein the cell corresponding to CC3 is the special cell of the user equipment 104.

When there is a change in the system information, the base station may judge to which user equipment(s) (i.e. the user equipment(s) affected by the change) the change should be notified based on corresponding configuration files, determines the special cell of each of the user equipment(s) as the cell for transmitting the first information to the each of the user equipment(s).

As an example, the base station may select, among one or more cells to which a user equipment is connected, one cell as the special cell of this user equipment. Particularly, the base station may select the special cell of a user equipment according to the corresponding configuration file or according to the information fed back by the user equipment (e.g. the channel quality, the signal strength, and the location of the user equipment, etc), based on a criterion (e.g. this special cell always keeps connection to the base station). For example, before transmitting the first information to a user equipment, the base station may select the special cell of a user equipment and notify the result of selection to the user equipment. For another example, the base station may perform the selecting step at a regular interval or as required, for example, when the user equipment moves to the edge of the coverage of a cell or moves out of the coverage of a cell, and may notify the result of selection to the user equipment and stores the result of the corresponding configuration file of the base station. In this way, when the base station needs to determine the special cell of the user equipment, it may query the corresponding configuration file.

As another example, the special cell may be selected by the user equipment and then notified to the base station. For example, the user equipment may determine the connection states of the cells supported by the user equipment based on its own configuration and select, among the cells that are kept in connection with the base station, one cell as the special cell for transmitting system information. For example, the user equipment may reconfigure or select its special cell at a regular interval, or based on its mobility conditions (e.g. when it moves to the edge, or moves out, of a cell) or other information (e.g. the channel quality, the signal strength, etc) and transmit the information of the special cell to the base station. The base station may stores the information in corresponding configuration file. Thus, when the base station needs to determine the special cell of the user equipment, it may query the corresponding configuration file. Alternatively, when the base station needs to determine the special cell of the user equipment, the base station may transmit to the user equipment a request instructing the user equipment to feed back the information of the special cell of the user equipment.

As described above, the special cell determined in step S204 is one of the cells to which the user equipment is connected, and corresponds to a component carrier which is being used by the user equipment and is kept in connection with the main node of the communication system. In the following, the special cell is also called as the first cell.

Then in step S206, the first information is sent to the user equipment via the first cell.

In the CA-S communication system, the first cell is always kept in connection with the main node (e.g. the base station). Thus, by using the above method, the case that the user equipment can not receive the updated system information can be avoided, so that the system information can be updated or provided in time. In addition, the base station needs not to transmit the system information or notify the update of the system information via each of the cells supported by the user equipment, thereby decreasing the signaling load of the whole system.

Figure 4:
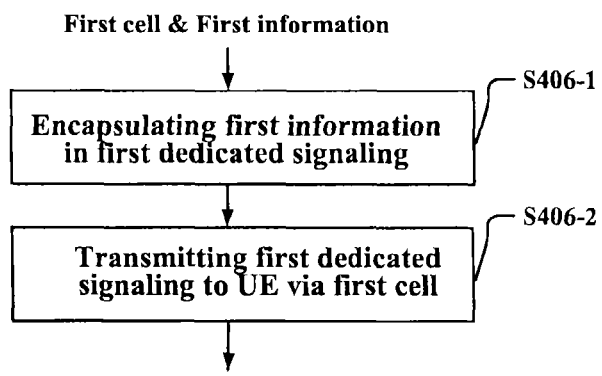
FIG. 4 and FIG. 5 are schematic flow charts illustrating the processes of transmitting first information to a user equipment via a first cell, respectively.
Figure 5:
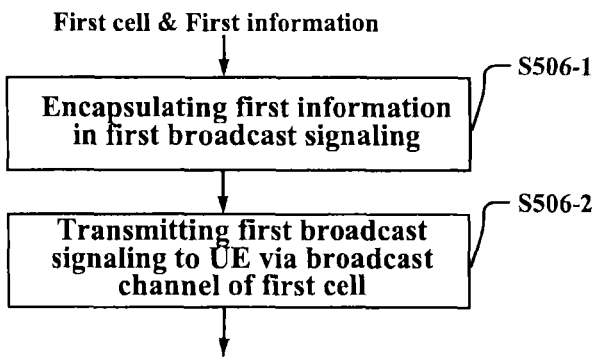

FIG. 4 and FIG. 5 each show an example of the process of transmitting the first information to the user equipment via the first cell.

In the example of FIG. 4, the process of transmitting the first information to the user equipment via the first cell may include sub-steps S406-1 and S406-2. In sub-step S406-1, the first information generated in the preceding step is encapsulated in a dedicated signaling (also referred to as the first dedicated signaling). Then in sub-step S406-2, the first dedicated signaling is sent to the user equipment via the first cell. In this example, the signaling generated in sub-step S406-1 is a dedicated signaling, thus in sub-step S406-2 this dedicated signaling is transmitted via the dedicated channel of the first cell.

In the disclosure, transmitting a dedicated signaling via a cell corresponding to a component carrier means that the dedicated signaling is transmitted via the dedicated channel of the cell, the description of which is not repeated hereinafter. The dedicated channel may be a Dedicated Control Channel (DCCH), such as the DCCH defined in LTE standard (e.g. ETSI TS 136 331 V8.5.0).

When a communication system includes many CA-S user equipments and the number of configured component carriers is relatively large, using dedicated signaling to transmit the first information to the user equipments (i.e. transmitting the first information via the dedicated channels of the first cells) will increase the signaling load of the system significantly. In such a case, the example of FIG. 5 may be used. As shown in FIG. 5, the process of transmitting the first information to the user equipment via the first cell may include sub-steps S506-1 and S506-2. In sub-step S506-1, the first information generated in the preceding step is encapsulated in a broadcast signaling (also called as the first broadcast signaling). Then in sub-step S506-2, the first broadcast signaling is sent to user equipment via the broadcast channel of the first cell. The broadcast channel may be a Broadcast Control Channel (BCCH), such as the BCCH defined in LTE standard (e.g. ETSI TS 136 331 V8.5.0). Compared with the dedicated signaling in the example of FIG. 4, using the broadcast signaling of FIG. 5 can decrease the signaling load of the system effectively.

Figure 6:
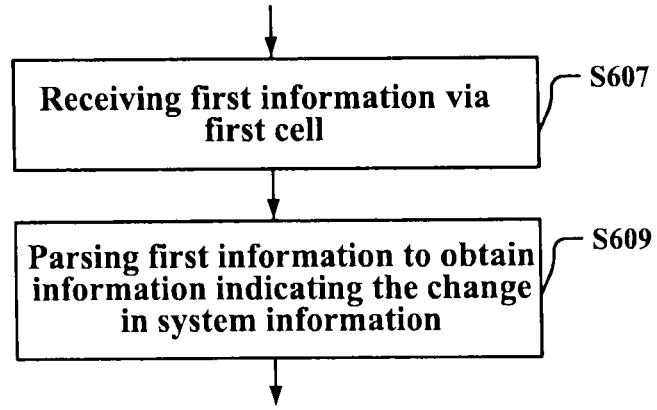
FIG. 6 shows an example of a method of updating system information by receiving information by a user equipment in the carrier aggregation supporting (CA-S) communication system according to the embodiment shown in FIG. 2.
Figure 7:
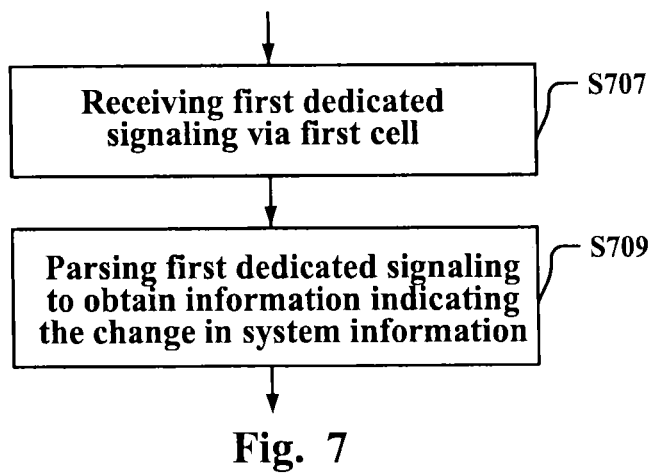
FIG. 7 shows an example of a receiving process corresponding the transmitting process as shown in FIG. 4.
Figure 8:
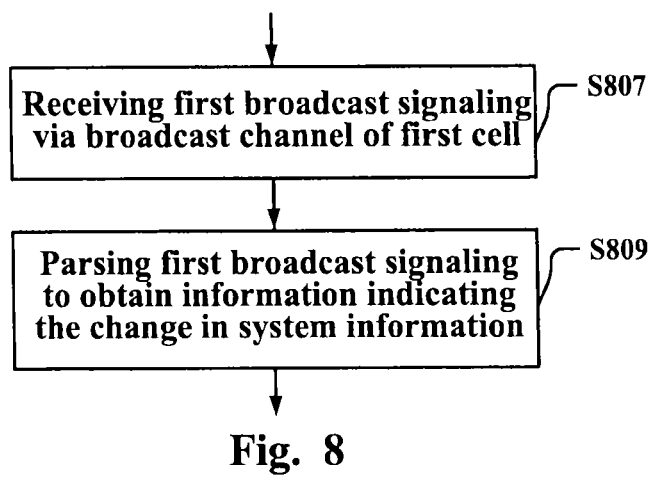
FIG. 8 shows an example of a receiving process corresponding the transmitting process as shown in FIG. 5.

The embodiment and examples shown in FIG. 2, FIG. 4 and FIG. 5 illustrate examples of the processes of transmitting information from a main node (e.g. the base station) of the communication system to a user equipment. FIG. 6 to FIG. 8 respectively show the corresponding process of receiving the information by a user equipment.

Particularly, FIG. 6 shows an example of a method of receiving information by a user equipment so as to update the system information in the CA-S communication system according to the embodiment of FIG. 2.

As shown in FIG. 6, the method may include steps S607 and S609.

In step S607, the user equipment receives the first information transmitted by the base station via the first cell, the first information includes information indicating that the system information changes. In other words, the user equipment receives the first information by listening to the component carrier (also called as the first component carrier)

corresponding to the first cell. The first cell has been described above, the description of which is not repeated.

In step S609, the user equipment parses the received first information to obtain the information indicating that the system information changes, so as to perform the update of the system information.

By using the above receiving method, the user equipment may get known of the change of the system information in time. Since the user equipment keeps being connected with the base station via the first cell (i.e. the special cell), the case that the user equipment can not receive the updated system information can be avoided. In addition, by using the first cell, the user equipment needs not to listen to all the cells corresponding to its supportable component carriers, thereby reducing the power consumption of the user equipment significantly and lengthening the lift time of the battery of the user equipment.

The transmitting process shown in FIG. 2 and the receiving process shown in FIG. 6 constitute an example of updating system information in the CA-S communication system.

FIG. 7 shows an example of receiving process corresponding to the transmitting process shown in FIG. 4. As shown in FIG. 4, the first information is encapsulated in a dedicated signaling (i.e. the first dedicated signaling) and is sent to the user equipment via the dedicated channel of the first cell. Thus in step S707, the user equipment receives the first dedicated signaling which contains the first information via the first cell thereof. In other words, the user equipment listens to the dedicated channel of its first cell to receive the first dedicated signaling. Similar to step S609, in step S709, the user equipment parses the first dedicated signaling, to obtain the information indicating that the system information changes.

FIG. 8 shows an example of receiving process corresponding to the transmitting process shown in FIG. 5. As shown in FIG. 5, the first information is encapsulated in the broadcast signaling (i.e. the first broadcast signaling) and is sent to the user equipment via the broadcast channel of the first cell. Thus in step S807, the user equipment receives the first broadcast signaling containing the first information via the broadcast channel of the first cell. In other words, the user equipment listens to the broadcast channel of the first cell to receive the first broadcast signaling. Step S809 is similar to step S609 or S709, the description of which is not repeated here.

The transmitting process shown in FIG. 4 and the receiving process shown in FIG. 7, the transmitting process shown in FIG. 5 and the receiving process shown in FIG. 8 respectively constitute examples of updating the system information. Compared with the method of using dedicated signaling as shown in FIG. 4 or FIG. 7, the examples shown in FIG. 5 and FIG. 8 utilize the broadcast signaling, by which the signaling load of the system may be decreased.

In addition, by using the first cell (the dedicated channel or the broadcast channel thereof), the user equipment needs not to listen to all the cells corresponding to all its supportable component carriers, thereby reducing the power consumption of the user equipment significantly and lengthening the lift time of the battery of the user equipment.

As an embodiment, the first information may contain only the information indicating that the system information changes, and in this case, the base station at the network side will transmit the updated system information by subsequent transmitting processes and the user equipment may receive the updated system information by subsequent receiving processes, which will be described below.

As another embodiment, the first information may further include the updated system information. That is, at the network side the base station transmit the updated system information to the user equipment directly via the first cell; and the user equipment may obtain the updated system information by parsing the first information, which will be described below.

As an example, the first information may further include the information (also referred to as the third information) indicating whether the change of the system information affects the CA transmission. For example, the third information may indicate the system information of which part of the system changes and the user equipment may determine whether the change affects the CA transmission based on this information.

Figure 9:
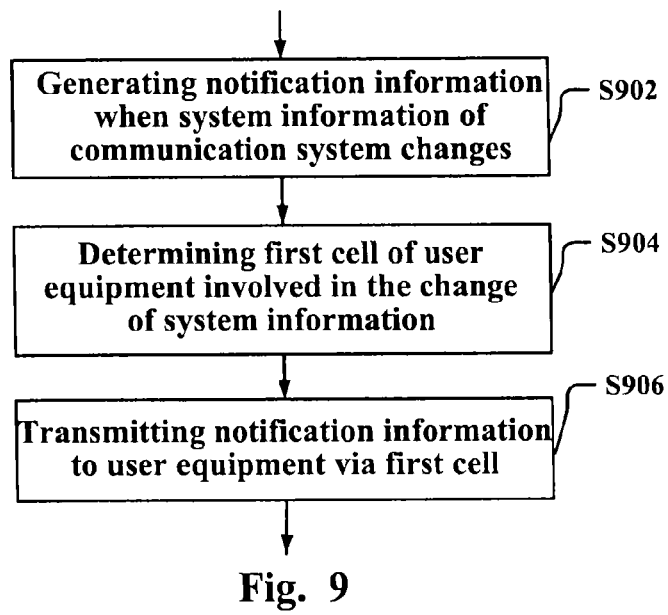
FIG. 9 is a schematic flow chart illustrating a method of notifying update of system information in a CA-S communication system according to an embodiment of the disclosure.

FIG. 9 shows an example of a method of notifying the update of system information in a CA-S communication system according to an embodiment of the disclosure. In the method, the network side of the communication system (e.g. the base station) notifies the user equipment of the change of the system information via the first cell. The first cell herein is the same as described above.

As shown in FIG. 9, the method includes steps S902, S904 and S906.

In step S906, when the system information of the communication system changes, the notification information indicating that the system information changes is generated. The notification information may include only the information indicating that the system information changes. As described above, the notification information may be regarded as an example of the first information.

Similar to the above embodiments, the communication system herein is a CA-S communication system, such as the communication system shown in FIG. 1. Whether the system information of the communication system changes or not may be judged by the main node (e.g. the base station) in the communication system. For example, related information may be obtained from the corresponding configuration file of the main node (the base station), to determine whether the system information changes.

In step S904, the cell to be used for transmitting the notification information to a user equipment which is involved in the change of the system information is determined.

Particularly, the base station may judge to which user equipment(s) (i.e. the user equipment(s) involved in the change) the change should be notified based on corresponding configuration files, determines the special cell of each of the user equipment(s) as the cell for transmitting the first information to the each of the user equipment(s). The special cell of a user equipment may be determined by using the above described method, the description of which is not repeated here Similar to the above embodiments, the cell determined in step 904 is one of the cells to which the user equipment is connected and corresponds to the component carrier which is being used by the user equipment and keeps in connection with the main node of the communication system. This cell is also called as the first cell or the special cell.

Then in step S906, the notification information is sent to the user equipment via the first cell.

Since the first cell always keeps in connection with the base station, the case that the user equipment can not receive the notification information can be avoided by using the above method. In this way the change of the system information can be notified to the user equipment in time. In addition, the base station needs not to send the notification information to the user equipment via each of a plurality of cells, by which the signaling load of the system may be reduced.

Figure 10:
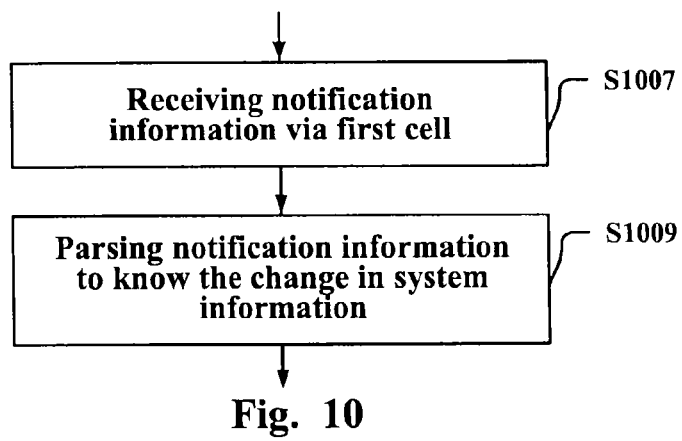
FIG. 10 is a schematic flow chart illustrating a method of receiving the notification indicating that system information changes in a CA-S communication system according to an embodiment of the disclosure.

FIG. 10 shows an example of a method of receiving notification that the system information changes in a CA-S communication system according to an embodiment of the disclosure. In the method, the user equipment of the communication system receives the notification information indicating that the system information changes from the base station by listening to the first cell. The first cell herein is the same as described above.

As shown in FIG. 10, the method includes steps S1007 and S1009.

In step S1007, the user equipment receives the notification information indicating that the system information changes which is transmitted from the base station via the first cell. In other words, the user equipment listens to the component carrier (also called as the first component carrier) corresponding to the first cell to receive the notification information.

In step S1009, the user equipment parses the received notification information, so as to get aware that the system information changes.

By using the above method, the user equipment can know the change of the system information in time, so as to update the system information subsequently. Since the user equipment keeps in connection with the base station via the first cell (i.e. the special cell), the case that it can not get the notification of the change can be avoided. In addition, by using the first cell, the user equipment needs not to listen to all the cells corresponding to its supportable component carriers, by which the power consumption of the user equipment can be reduced significantly and the lift time of the battery of the user equipment can be lengthened.

The transmitting process shown in FIG. 9 and the receiving process shown in FIG. 10 constitute an example of updating the system information in the CA-S communication system.

Figure 11:
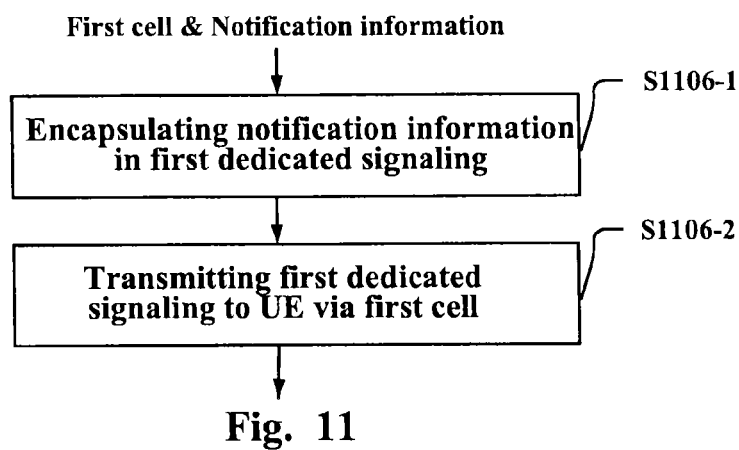
FIG. 11 and FIG. 12 are schematic flow charts illustrating examples of transmitting notification information to a UE via the first cell, respectively.
Figure 12:
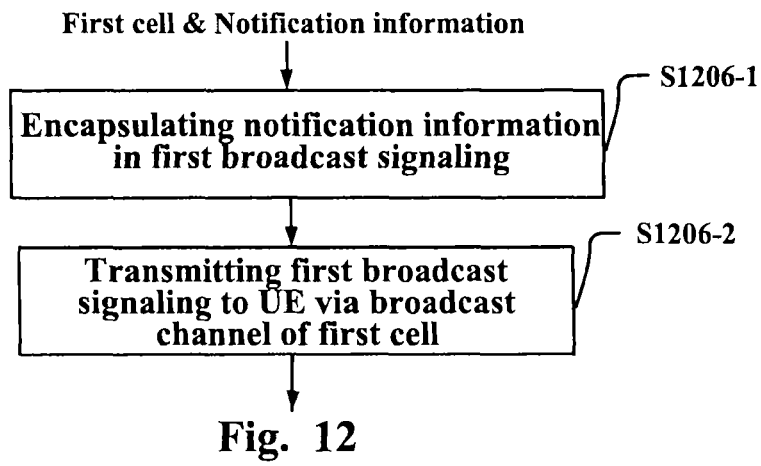

FIG. 11 and FIG. 12 respectively show examples of transmitting notification information to the user equipment via the first cell.

In the example of FIG. 11, the step of transmitting the notification information via the first cell to the user equipment may include sub-steps S1106-1 and S1106-2. In sub-step S1106-1, the notification information generated in the preceding step is encapsulated in a dedicated signaling (also called as the first dedicated signaling). Then in sub-step S1106-2, the first dedicated signaling is sent to the user equipment via the first cell. The signaling generated in sub-step S1106-1 is a dedicated signaling, and in sub-step S1106-2 the dedicated signaling is sent via the dedicated channel of the first cell.

When a communication system includes many CA-S user equipments and the number of configured component carriers is relatively large, using dedicated signaling to transmit the first information to the user equipments (i.e. transmitting the first information via the dedicated channels of the first cells) will increase the signaling load of the system significantly. In such a case, the example of FIG. 12 may be used. As shown in FIG. 12, the process of transmitting the notification information to the user equipment via the first cell may include sub-steps S1206-1 and S1206-2. In sub-step S1206-1, the notification information generated in the preceding step is encapsulated in a broadcast signaling (also called as the first broadcast signaling). Then in sub-step S1206-2, the first broadcast signaling is sent to user equipment via the broadcast channel of the first cell. Compared with the dedicated signaling in the example of FIG. 11, using the broadcast signaling of FIG. 12 can decrease the signaling load of the system effectively.

Figure 13:
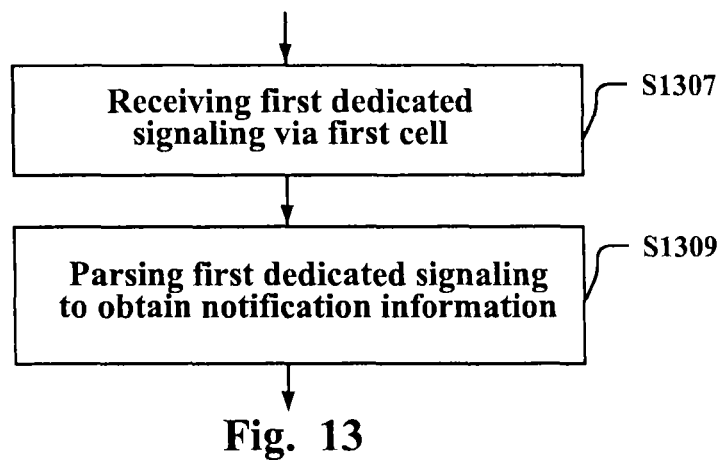
FIG. 13 shows an example of a receiving process corresponding the transmitting process as shown in FIG. 11.

FIG. 13 shows an example of a receiving process corresponding to the transmitting process shown in FIG. 11. As shown in FIG. 11, the first information is encapsulated in a dedicated signaling (the first dedicated signaling) and is sent to the user equipment via the first cell. Thus in step S1307, the user equipment receives the first dedicated signaling containing the notification information via the component carrier (also called as the first component carrier) corresponding to its first cell. In other words, the user equipment listens to the dedicated channel of the first cell to receive the first dedicated signaling. Similar to step S1009, in step S1309 the user equipment parses the first dedicated signaling to obtain the notification information indicating that the system information changes, so as to get aware of the change of the system information.

Figure 14:
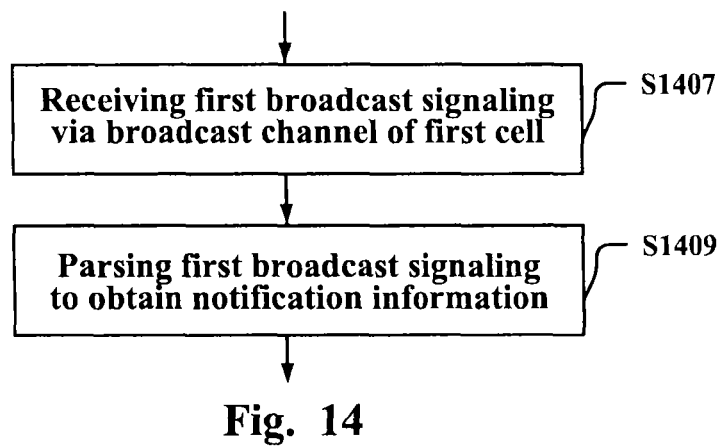
FIG. 14 shows an example of a receiving process corresponding the transmitting process as shown in FIG. 12.

FIG. 14 shows an example of receiving process corresponding to the transmitting process shown in FIG. 12. As shown in FIG. 12, the notification information is encapsulated in the broadcast signaling (the first broadcast signaling) and is sent to the user equipment via the broadcast channel of the first cell. Thus in step S1407, the user equipment receives the first broadcast signaling containing the notification information via the broadcast channel of the first cell. In other words, the user equipment listens to the broadcast channel of the first cell to receive the first broadcast signaling. Step S1409 is similar to step S1009 or S1309, the description of which is not repeated here.

The transmitting process shown in FIG. 11 and the receiving process shown in FIG. 13, the transmitting process shown in FIG. 12 and the receiving process shown in FIG. 14 respectively constitute examples of updating the system information. Compared with the method of using dedicated signaling as shown in FIG. 11 or FIG. 13, the examples shown in FIG. 12 and FIG. 14 utilize the broadcast signaling, by which the signaling load of the system may be decreased.

In addition, by using the first cell (the dedicated channel or the broadcast channel), the user equipment needs not to listen to all the cells corresponding to its supportable component carriers, by which the power consumption of the user equipment can be reduced and the life time of the battery of the user equipment can be lengthened.

It should be noted, the dedicated signaling and the broadcast signaling in this disclosure each may be a newly defined signaling, or may be a signaling obtained by extending a known signaling. The disclosure is not limited to any of the examples.

Figure 15:
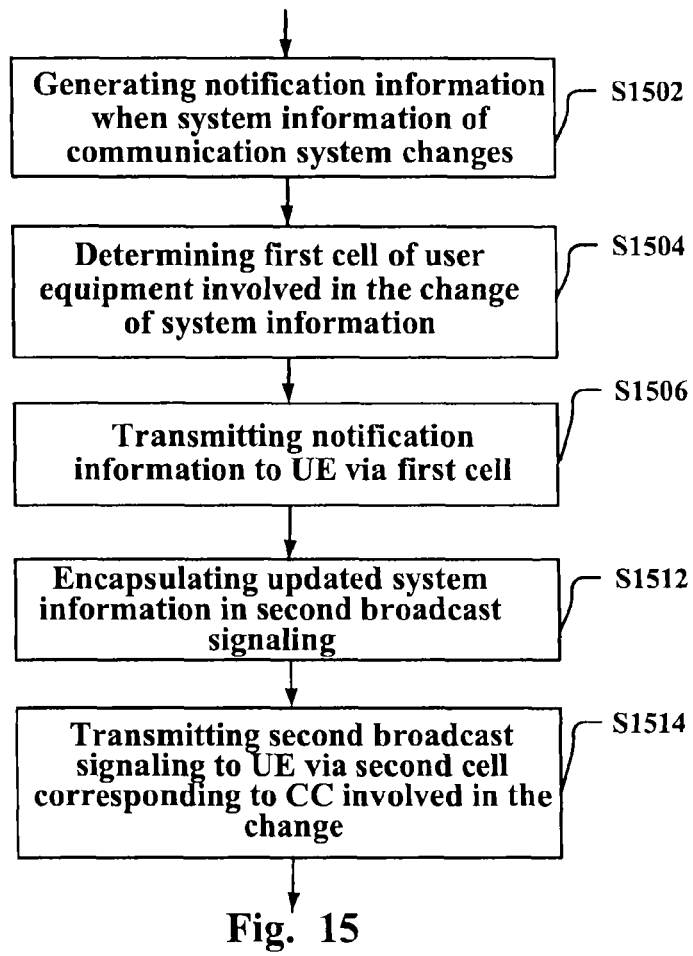
FIG. 15 is a schematic flow chart illustrating a method of providing updated system information in a CA-S communication system according to an embodiment of the disclosure.

FIG. 15 shows a method of providing the updated system information in the CA-S communication system according to an embodiment of the disclosure. The method shown in FIG. 15 is based on the example shown in FIG. 9, or FIG. 11, or FIG. 12. The difference lies in that, the method of FIG. 15 further includes a process of transmitting the updated system information.

As shown in FIG. 15, the method includes steps S1502, S1504, S1506, S1512 and S1514.

Steps S1502, S1504 and S1506 may be similar to the corresponding steps shown in FIG. 9, FIG. 11 or FIG. 12, the description of which is not repeated here.

In step S1512, the network side (e.g. the base station) of the communication system encapsulated the updated system information in a broadcast signaling (also called as the second broadcast signaling). Then in step S1514, the second broadcast signaling is transmitted to the user equipment via the cell (also called as the second cell) corresponding to the component carrier involved in the change of the system information.

Figure 16:
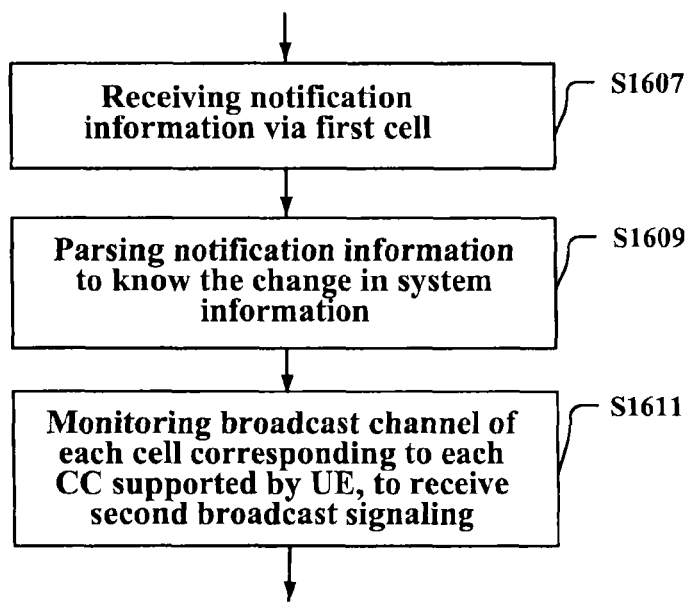
FIG. 16 is a schematic flow chart illustrating a method of receiving updated system information in a CA-S communication system according to an embodiment of the disclosure.

FIG. 16 shows a method of receiving the updated system information in the CA-S communication system according to an embodiment of the disclosure. The method shown in FIG. 16 is based on the method shown in FIG. 10, FIG. 13 or FIG. 14. The difference lies in that, the method shown in FIG. 16 further includes a process of receiving the updated system information.

As shown in FIG. 16, the method includes steps S1607, S1609 and S1611.

Step S1607 and S1609 are similar to the corresponding steps shown in FIG. 10, FIG. 13 or FIG. 14, the description of which is not repeated here.

As shown in FIG. 15, the network side (e.g. the base station) of the communication system encapsulated the updated system information in the second broadcast signaling and transmits the he second broadcast signaling via the broadcast channel of the second cell. Accordingly, since the user equipment does not know on which cell's broadcast channel the base station will transmit the updated system information, thus when the user equipment gets aware that the system information changes, it starts to perform the process shown in step S1611. That is, the user equipment starts listening to the broadcast channels of all the cells corresponding to its supportable component carriers, in order to receive the second broadcast signaling. After receiving the second broadcast signaling, the user equipment parses it to obtain the updated system information.

The transmitting process shown in FIG. 15 and the receiving process shown in FIG. 16 constitute an example of updating the system information in the CA-S communication system.

In the above embodiments, the network side (the base station) of the communication sends the updated system information via the second cell corresponding to an involved component carrier, and the UE needs to listens to all the cells corresponding to all of its supportable component carriers. With the method, no additional information is needed to be transmitted during the process of providing the notification information (e.g. steps S1502-S1506). Thus the process of notifying the change of the system information can be simplified.

Figure 17:
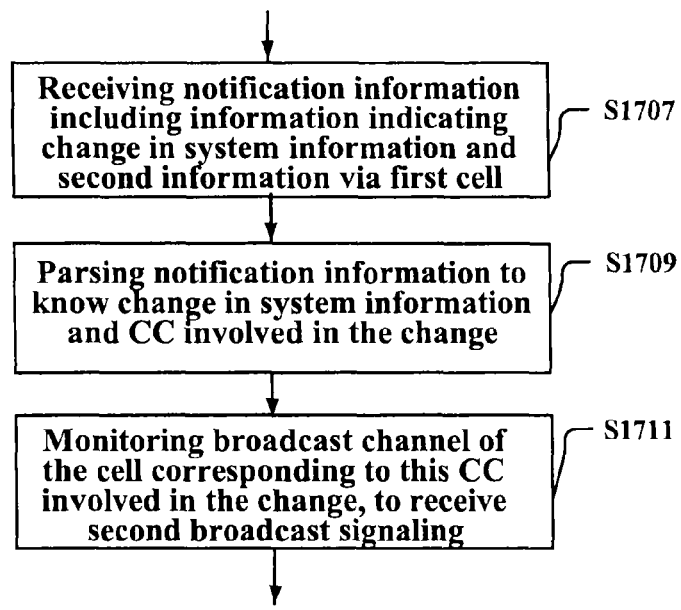
FIG. 17 is a schematic flow chart illustrating a method of receiving updated system information according to another embodiment of the disclosure.

FIG. 17 shows a method of receiving the updated system information in the CA-S communication system according to another embodiment of the disclosure. In the embodiment, the notification information may further include information (also called as the second information) for identifying a component carrier involved in the change of the system information. As shown in FIG. 17, after receives the notification information including the second information and the information indicating that the system information changes in step S1707, the user equipment parses the notification information to obtain the second information in step S1709. Then in step S1711, the user equipment listens to the broadcast channel of the cell corresponding to the component carrier involved in the change of the system information based on the second information, to obtain the updated system information. In the embodiment, the user equipment needs not to listen to the broadcast channels of all the cells corresponding to all of its supportable component carriers. Compared with the method shown in FIG. 16, with the method of FIG. 17, the power consumption of the user equipment can be reduced significantly and the life time of the battery of the user equipment can be lengthened.

Figure 18:
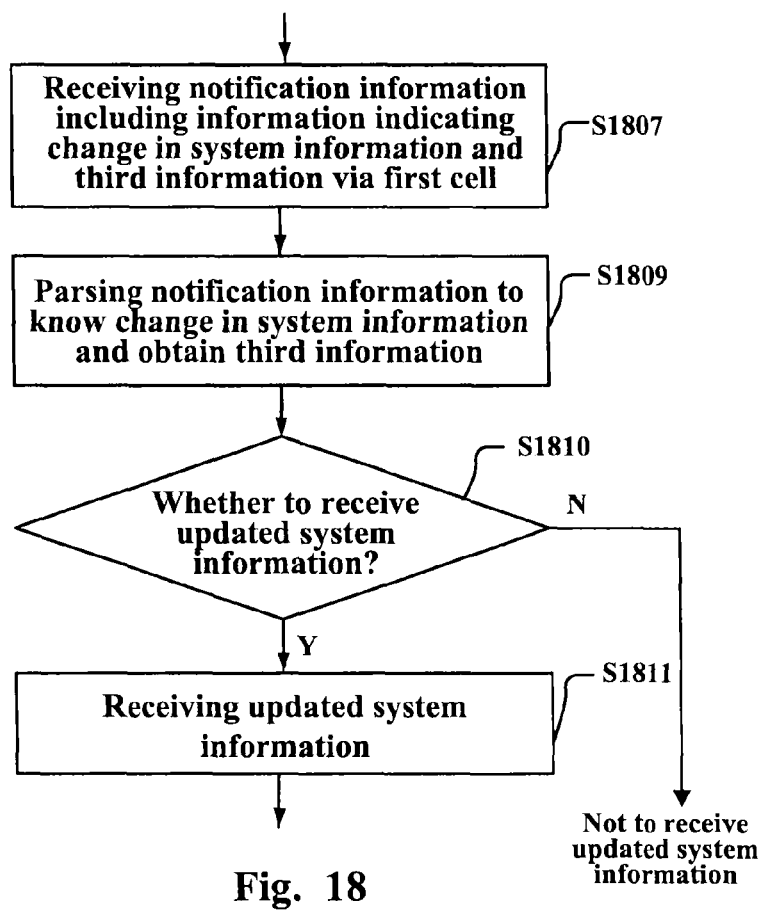
FIG. 18 is a schematic flow chart illustrating a method of receiving updated system information according to yet another embodiment of the disclosure.

FIG. 18 shows a method of receiving the updated system information according to another embodiment of the disclosure. In the embodiment, the notification information may further include the information (also called as the third information) indicating whether the change of the system information affects the CA transmission. For example, the third information may indicate that change of the system information occurs in which part(s) of the communication system and the user equipment can judge whether the change affects its CA transmission based on this information. Particularly, when the user equipment receives the notification information containing the third information and the information indicating that the system information changes in step S1807, it may parses the notification information to obtain the third information in step 1809. Then in step S1810, the user equipment decides whether to receive the updated system information based on the third information. For example, if the user equipment supports CA and the third information indicates that the change of the system information does not affect the CA transmission, the user equipment may choose not to receive the updated system information. On the other hand, if the user equipment does not support CA and the third information indicates that the change of the system information affects the CA transmission, the user equipment, the user equipment may also choose not to receive the updated system information. If decides to receive the updated system information, the user equipment listens to the corresponding channel to receive the updated system information in step S1811. Step S1811 may be similar to step S1611 or step S1711, the description of which is not repeated here.

In the transmitting and receiving processes shown in FIG. 15 and FIG. 16, the updated system information is encapsulated in the second broadcast signaling and is transmitted and received via the broadcast channel of the second cell. In another embodiment, the updated system information may be encapsulated in a dedicated signaling (also called as the third dedicated signaling) and is transmitted and received via the dedicated channel of the second cell. In this embodiment, the notification information further contains the information (the second information) for identifying a component carrier involved in the change of the system information. When the user equipment receives the notification information including the second information, it parses the notification information to obtain the second information and based on the second information, it listens to the dedicated channel of the cell corresponding to the component carrier involved in the change, so as to obtain the updated system information. In the embodiment, the user equipment needs not to listen to the broadcast channels of all the cells corresponding to all of its supportable component carriers. Thus, the power consumption of the user equipment can be reduced significantly and the life time of the battery of the user equipment can be lengthened.

As described above, the broadcast signaling and the dedicated signaling each may be a newly defined signaling, or may be an extension to a known signaling.

Figure 19:
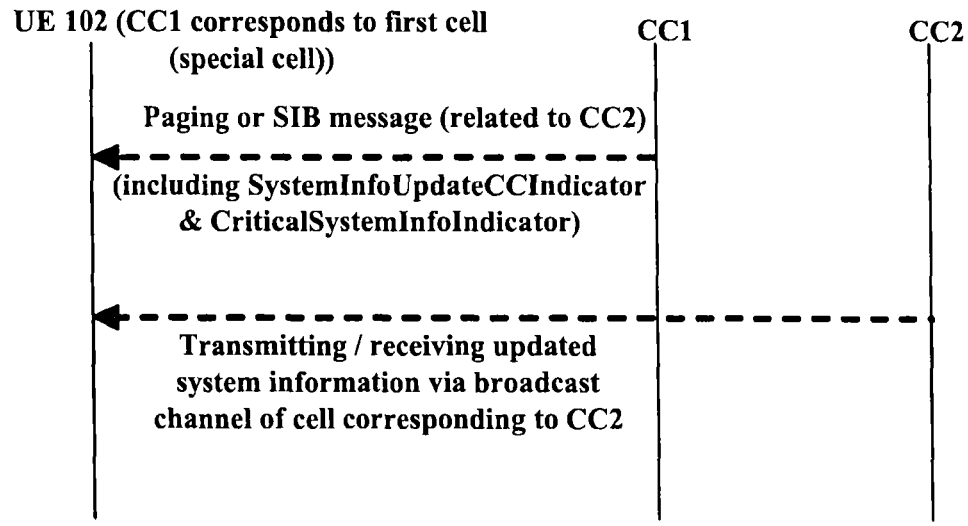
FIG. 19 is a schematic diagram illustrating the process of notifying the change in system information by using extended conventional signaling under a CA supporting scenario.

As an example, the first broadcast signaling may be an extension to the Paging message in LTE Release 8, or may be an extension to the system information block (SIB1) message. For example, the second information and/or the third information can be inserted in the Paging or SIB1 message. Particularly, two indicators may be inserted in the Paging or SIB1 message, including a first indicator (e.g. SystemInfoUpdateCCIndicator) and a second indicator (e.g. CriticalSystemInfoIndicator). The first indicator may contain the second information, i.e. to identify the system information of which component carrier changes. The second indicator contains the third information, i.e. to identify whether the change of the system information affects the CA transmission (e.g. it may indicate which part's system information changes, and the user equipment may determine whether its CA transmission is affected based on this information). FIG. 19 is a schematic diagram showing the notification of the change of system information by using the Paging or SIB1 message as the first broadcast signaling under a CA scenario. As shown in FIG. 19, the extended Paging or SIB1 message is transmitted via the broadcast channel of the first cell (corresponding to CC1) of the user equipment 102. Then, the updated system information is transmitted via the cell corresponding to CC2. Of course, this is only an example of using the first broadcast signaling, and the disclosure should not be regarded as being limited to this. As described above, the first broadcast signaling may be a newly defined signaling.

Figure 20:
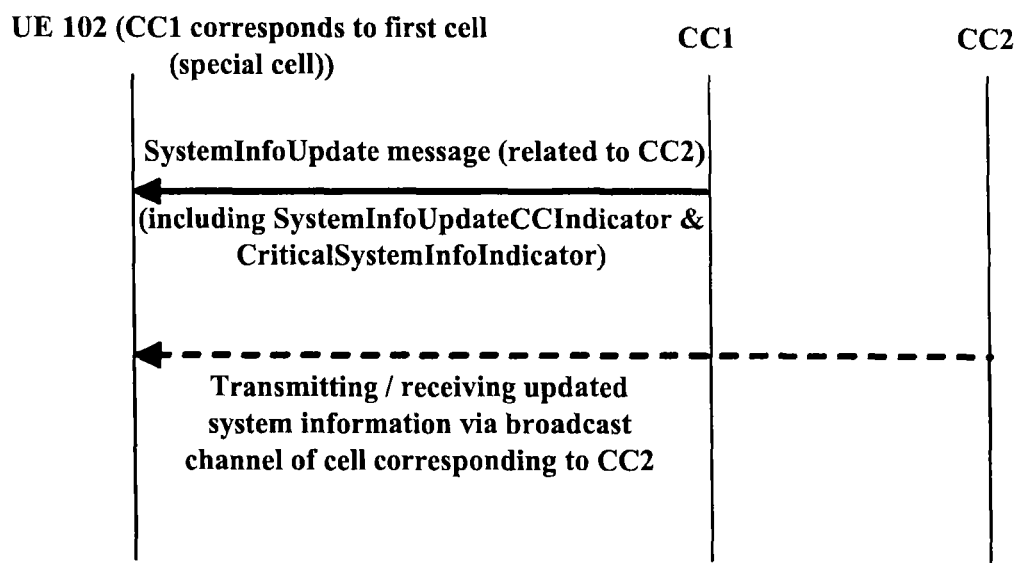
FIG. 20 is a schematic diagram illustrating the process of notifying the change in system information by using a dedicated signaling under a CA supporting scenario.

Similar to the first broadcast signaling, the first dedicated signaling may be a newly defined signaling, or may be an extension to a known signaling. Also similar to the first broadcast signaling, the first dedicated signaling may contain the second information and/or the third information. For example, the first dedicated signaling may contain two indicators, such as the first indicator (e.g. SystemInfoUpdateCCIndicator) and the second indicator (e.g. CriticalSystemInfoIndicator). The first indicator may contain the second information, i.e. to identify the system information of which component carrier changes. The second indicator contains the third information, i.e. to identify whether the change of the system information affects the CA transmission (e.g. the information may indicate which part's system information changes, and the user equipment may determine whether its CA transmission is affected based on this information). FIG. 20 is a schematic diagram showing the notification of the change of system information by using the first dedicated signaling under a CA scenario. As shown in FIG. 20, the first dedicated signaling (e.g. the SystemInfoUpdate message as shown) is transmitted via the dedicated channel of the first cell (corresponding to CC1) of the user equipment 102. Then, the updated system information is transmitted via the cell corresponding to CC2.

Figure 21:
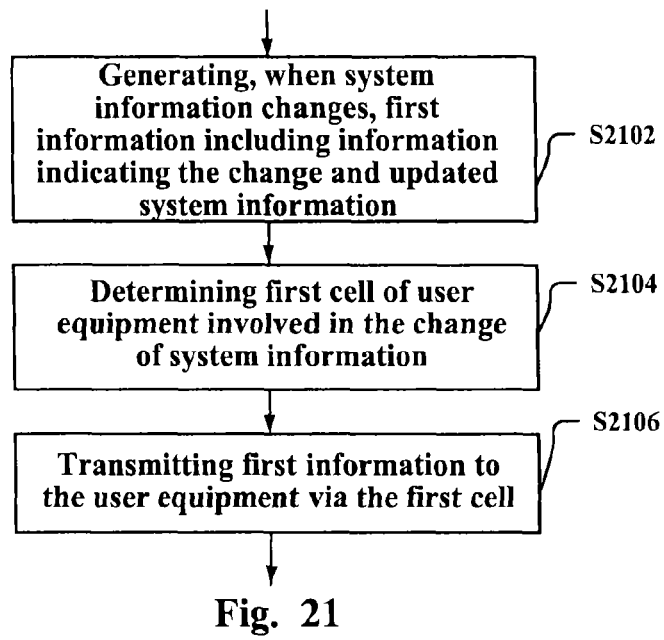
FIG. 21 is a schematic flow chart illustrating a method of providing updated system information in a CA-S communication system according to an embodiment of the disclosure.

FIG. 21 shows a method of providing the updated system information in the CA-S communication system according to an embodiment of the disclosure. In the method of FIG. 21, the network side (the base station) of the communication system transmits the updated system information to the user equipment via the first cell (the special cell) of the user equipment.

As shown in FIG. 21, the method includes steps S2102, S2104 and S2106.

In step S2102, when the system information of the communication system changes, the first information is generated. Different from the embodiment shown in FIG. 2, in this embodiment the first information further includes the updated system information, in addition to the information indicating that the system information changes.

Similar to the above embodiments, whether the system information of the communication system changes or not may be judged by the main node (e.g. the base station) of the communication system. For example, related information may be obtained from the corresponding configuration file of the main node (the base station), to determine whether the system information changes. The updated system information may also be obtained from the corresponding configuration file of the base station.

In step S2104, the cell, i.e. the first cell, to be used to transmit the first information to the user equipment involved in the change of the system information is determined. The first cell here is the same as described above, the description of which is not repeated.

When there is a change in the system information, the base station may judge to which user equipment(s) (i.e. the user equipment(s) affected by the change) the change should be notified based on corresponding configuration files, determines the special cell of each of the user equipment(s) as the cell for transmitting the first information to the each of the user equipment(s). The special cell of a user equipment can be determined by using the method as described above, the description of which is not repeated here.

Then in step S2106, the first information is sent to the user equipment via the first cell.

Since the first cell is always kept in connection with the main node (e.g. the base station). Thus, by using the above method, the case that the user equipment can not receive the updated system information can be avoided.

Figure 22:
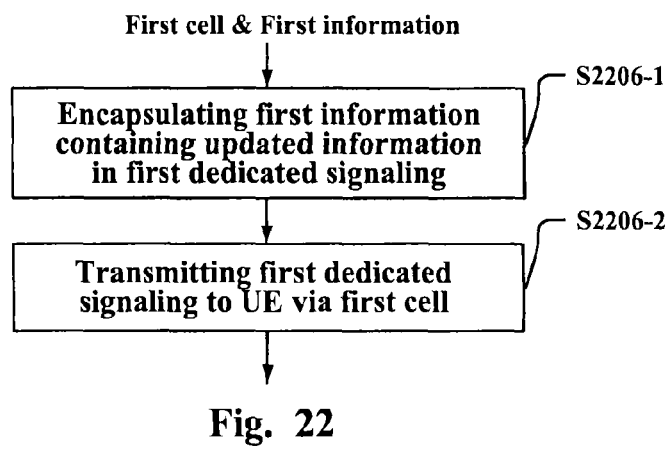
FIG. 22 and FIG. 23 are schematic flow charts illustrating examples of transmitting first information containing updated system information via the first cell to a user equipment, respectively.
Figure 23:
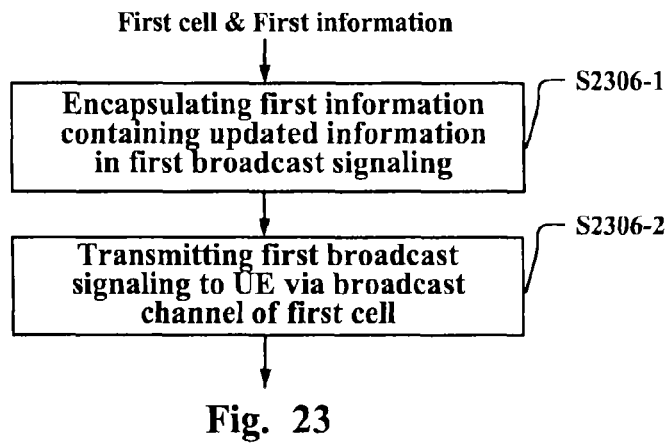

FIG. 22 and FIG. 23 respectively show the processes of transmitting the first information containing the updated system information to the user equipment via the first cell.

In the example of FIG. 22, the step of transmitting the first information to the user equipment via the first cell may include sub-steps S2206-1 and S2206-2. In sub-step S2206-1, the first information containing the updated system information generated in step S2102 is encapsulated in a dedicated signaling (also called as the first dedicated signaling). Then in sub-step S2206-2, the first dedicated signaling is sent to the user equipment via the first cell. That is, the first dedicated signaling is sent via the dedicated channel of the first cell.

In the example of FIG. 23, the step of transmitting the first information to the user equipment via the first cell may include sub-steps S2306-1 and S2306-2. In sub-step S2306-1, the first information containing the updated system information generated in step S2102 is encapsulated in a broadcast signaling (also called as the first broadcast signaling). Then in sub-step S2306-2, the first broadcast signaling is sent to the user equipment via the broadcast channel of the first cell. Compared with the method of using the dedicated signaling shown in FIG. 22, using the broadcast signaling as shown in FIG. 23 can effectively reduce the signaling load of the system.

Figures 24, 25, 26:
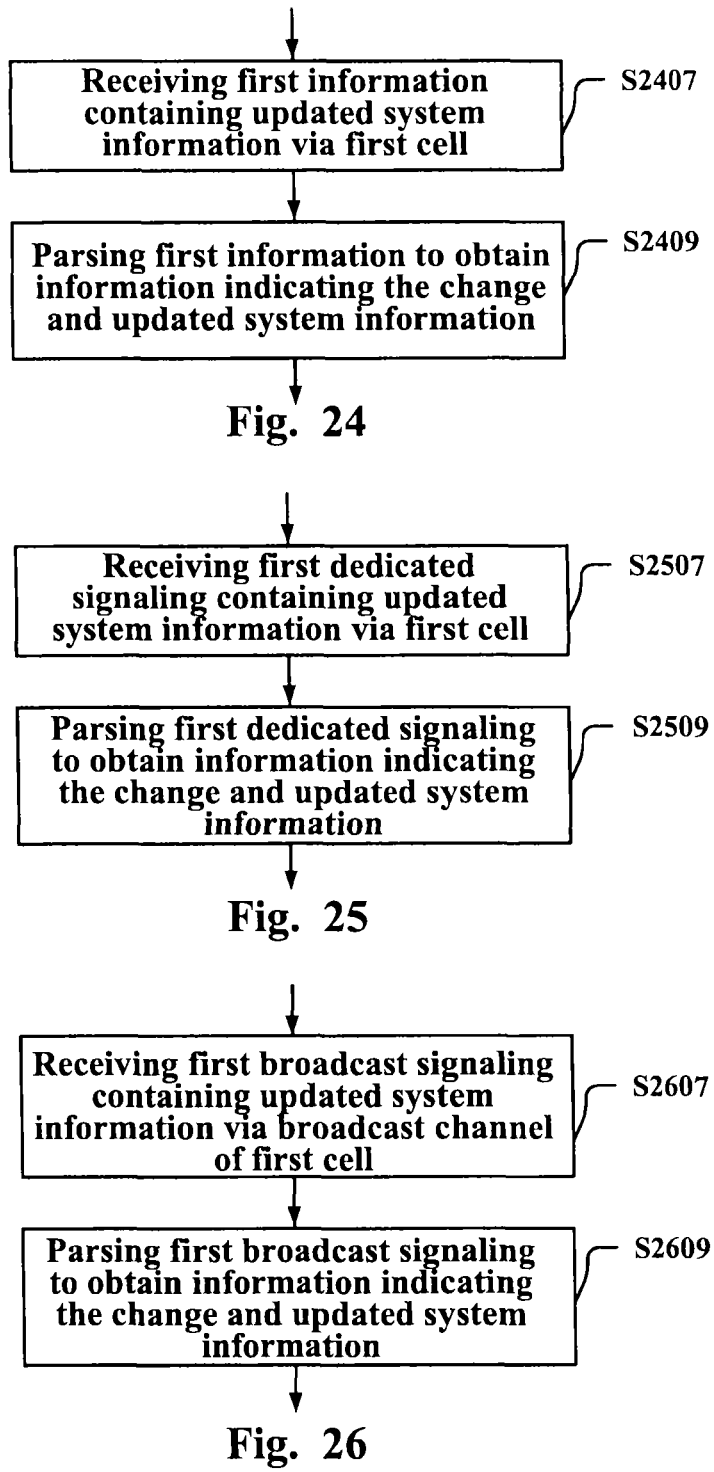
FIG. 24 to FIG. 26 are schematic flow charts illustrating examples of receiving updated system information by a user equipment according to embodiments of the disclosure, respectively.

FIG. 24 to FIG. 26 show examples of receiving the updated system information by the user equipment.

FIG. 24 shows a method of receiving the updated system information by the user equipment in the CA-S communication system based on the embodiment of FIG. 21.

As shown in FIG. 24, the method includes steps S2407 and S2409.

In step S2407, the user equipment receives the first information the transmitted by the base station via the first cell. The first information contains information indicating that the system information changes and the updated system information. In other words, the user equipment listens to the component carrier (also called as the first component carrier) corresponding to the first cell to receive the first information.

In step S2409, the user equipment pareses the first information to get aware of the change of the system information and to obtain the updated system information.

By using the method, the user equipment may get the updated system information in time. Since the user equipment keeps being connected with the base station via the first cell (i.e. the special cell), the case that the user equipment can not receive the updated system information can be avoided. In addition, by using the first cell, the user equipment needs not to listen to all the cells corresponding to its supportable component carriers, thereby reducing the power consumption of the user equipment significantly and lengthening the lift time of the battery of the user equipment.

The transmitting process of FIG. 21 and the receiving process of FIG. 24 constitute an example of updating the system information in the CA-S communication system.

FIG. 25 shows a receiving process corresponding to the transmitting process of FIG. 22. As shown in FIG. 22, the first information is encapsulated in a dedicated signaling (the first dedicated signaling) and is sent to the user equipment via the dedicated channel of the first cell. Thus in step S2507, the user equipment receives the first dedicated signaling containing the first information via its first cell. In other words, the user equipment listens to the dedicated channel of the first cell to receive the first dedicated signaling. Similar to step S2409, in step S2509 the user equipment pareses the first dedicated signaling to obtain the updated system information.

FIG. 26 shows a receiving process corresponding to the transmitting process of FIG. 23 As shown in FIG. 23, the first information is encapsulated in a broadcast signaling (the first broadcast signaling) and is sent to the user equipment via the broadcast channel of the first cell. Thus in step S2607, the user equipment receives the first broadcast signaling containing the first information via the broadcast channel of the first cell. In other words, the user equipment listens to the broadcast channel of the first cell to receive the first broadcast signaling. Step S2609 is similar to step S2409 or S2509, the description of which is not repeated here.

The transmitting process of FIG. 22 and the receiving process of FIG. 25, the transmitting process of FIG. 23 and the receiving process of FIG. 26 respectively constitute examples of updating the system information of the disclosure. Compared with the methods of using the dedicated signaling in FIG. 22 and FIG. 25, using the broadcast signaling as shown in FIG. 23 and FIG. 26 can effectively reduce the signaling load of the system.

In addition, by using the first cell (the dedicated channel or the broadcast channel), the user equipment needs not to listen to all the cells corresponding to its supportable component carriers, thereby reducing the power consumption of the user equipment significantly and lengthening the lift time of the battery of the user equipment.

In addition, the change of system information described in the disclosure may include any change in the system information resulted from the change of the system configuration and architecture. For example, the change may include but not limited to: adding a carrier segment to an activated component carrier, adding an extension carrier, activating (adding) a new component carrier, and the like. Thus, the updated system information may include any system information related to such changes. For example, when adding a carrier segment to an activated component carrier, the updated system information may include configuration information related to the carrier segment; when adding an extension carrier for a user equipment, the updated system information may include configuration information related to the extension carrier; when adding an extension carrier, activating (adding) a new component carrier, the updated system information may include configuration information related to the new component carrier, the description of which is not detailed herein.

Figure 27:
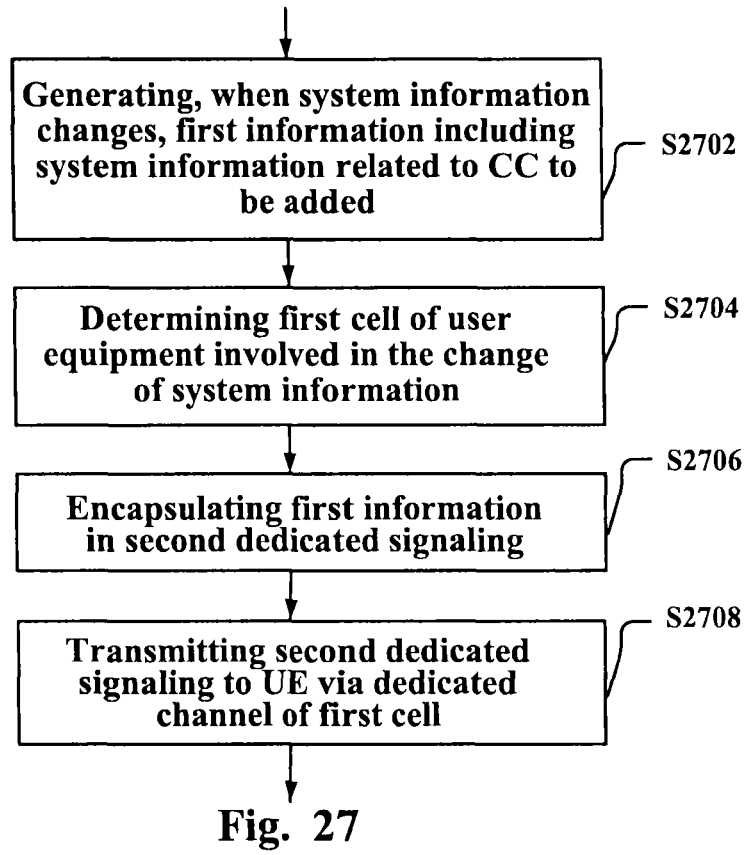
FIG. 27 is a schematic flow chart illustrating a method of providing system information when a component carrier is to be added according to an embodiment of the disclosure.

FIG. 27 shows a method of providing the system information in the case a component carrier is to be added according to an embodiment of the disclosure.

As shown in FIG. 27, the method includes steps S2702, S2704, S2706 and S2708.

In step S2702, when a component carrier is to be added, the first information is generated. The first information may include the information indicating that a component carrier is to be added and the system information related to the component carrier.

In step S2704, the cell (the first cell) to be used to transmit the first information to the user equipment for which component carrier is to be added is determined. The first cell herein has been described above and will not be repeated here.

Particularly, the base station determines the special cell of the user equipment based on corresponding configuration file, as the cell for transmitting the first information to the user equipment. The special cell of the user equipment can be determined by using the method described above, the description of which is not repeated here.

In step S2706, the first information is encapsulated in a dedicated signaling (also called as the second dedicated signaling). Then in step S2708, the second dedicated signaling is sent to the user equipment via the first cell. That is, the second dedicated signaling is transmitted via the dedicated channel of the first cell.

Since the first cell is always kept in connection with the main node (e.g. the base station). Thus, by using the above method, the system information related to the component carrier to be added can be sent to the user equipment in time. And the case that the user equipment can not receive the updated system information can be avoided.

Figure 28:
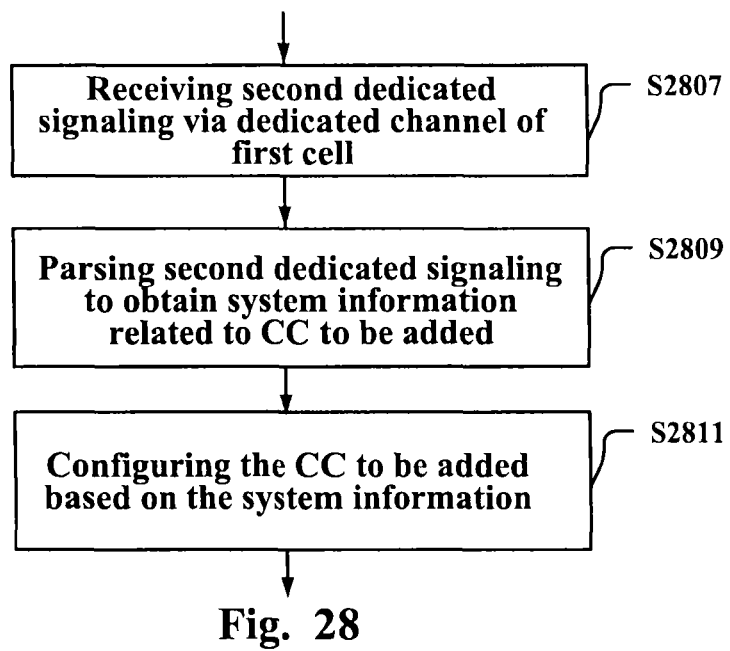
FIG. 28 is a schematic flow chart illustrating a method of receiving system information by a user equipment corresponding to the providing method shown in FIG. 27.

FIG. 28 shows an example of receiving the system information corresponding to the transmitting process of FIG. 27.

As shown in FIG. 28, the method includes steps S2807, S2809 and S2811.

In step S2807, the user equipment receives the second dedicated signaling via the dedicated channel of the first cell.

In step S2809, the user equipment parses the second dedicated signaling, to obtain the component carrier to be added and to obtain the system information related to the component carrier.

In step S2811, the user equipment configures the component carrier to be added based on the system information so as to activate the component carrier.

By using the method, the user equipment may obtain the updated system information in time. Since it keeps in connection with the base station via the first cell (the special cell), the case that the system information can not be received is avoided. In addition, by using the dedicated signaling, the CA-NS user equipment will not receive such information.

The transmitting process of FIG. 27 and the receiving process of FIG. 28 constitute an example of updating the system information in the CA-S communication system.

In an example, the component carrier to be added may be an extension carrier. And in such a case, step S2706 may include encapsulating the configuration information related to the extension carrier in the second dedicated signaling. Accordingly, after the user equipment receives the second dedicated signaling containing the configuration information related to the extension carrier, it parses the second dedicated signaling to obtain the configuration information and configures the extension carrier based on configuration information.

In another example, the component carrier to be added may include a carrier segment to be attached to the component carrier. In this case, the network side (the base station) of the communication system may transmit the configuration information related to carrier segment to the user equipment via the first cell. As an example, the configuration information related to the carrier segment and the system information related to the component carrier to be added both may be encapsulated in the second dedicated signaling. Accordingly, the user equipment receives the system information related to the component carrier via the dedicated channel of the first cell and configures the component carrier based on the information. If the configuration information related to the carrier segment and the system information related to the component carrier to be added both are encapsulated in the second dedicated signaling, the user equipment may further obtain the configuration information related to the carrier segment by parsing the second dedicated signaling and configure the carrier segment based on the configuration information.

In an example, the system information related to the component carrier to be added may include transmission bandwidth configuration information and frequency band indicator information related to the component carrier to be added. If the component carrier to be added is used for uplink transmission or if the component carrier to be added is used for downlink transmission but uplink information needs to be configured for it, the system information related to the component carrier to be added may further include the uplink carrier frequency, the uplink transmission bandwidth and the configuration information of uplink channels of the component carrier to be added. If the component carrier to be added is for downlink transmission, the system information related to the component carrier to be added may further include the configuration information of the downlink channels of the component carrier to be added.

As an example, the system information may adopt the format of the system information defined in LTE standard. The system information may include main information block (MIB) and one or more system information block (SIB). The MIB contains some most important information and related parameters for obtaining other important information from the cell, such as the downlink bandwidth configuration, the physical hybrid automatic repeat request indicator channel configuration, and the like. An SIB may include information such as whether the user equipment is allowed to be connected to a cell, the radio resource configuration information of the user equipment, the cell reselection information, and the like.

As described above, the second dedicated signaling may be newly defined signaling, or may be an extension to a known signaling. As an example, the second dedicated signaling may be an extension to the radio resource control connection reconfiguration message (e.g. RRCConnection-Reconfigurationmessage). In this case, step S2706 may include encapsulating the first information in the radio resource control connection reconfiguration message. By using the known signaling, the trouble of redefining a new message structure is avoided.

As an example, the extension to the radio resource control connection reconfiguration message (RRCConnectionReconfiguration) may include the system information, such as MIB, SIB1, and SIB2, etc. Particularly, MIB may include the following:

dl-Bandwidth: transmission bandwidth configuration information, i.e. the number of RBs in the downlinks.

phich-Config: PHICH (Physical hybrid-ARQ indicator channel) channel configuration information.

SIB1 may include: freqBandIndicator: which is a frequency indicator flag.

If the component carrier to be added is for uplink transmission or it needs to configure the uplink information of a downlink component carrier, SIB2 may include the following:

ul-CarrierFreq: carrier frequency.

ul-Bandwidth: uplink transmission bandwidth, i.e. the number of RBs in the uplink.

rach-Config: RACH (Random Access Channel) channel configuration information.

prach-Config: PRACH (Physical Random Access Channel) channel configuration information.

pusch-Config: PUSCH (Physical uplink shared channel) channel configuration information.

pucch-Config: PUCCH (Physical uplink control channel) channel configuration information.

soundingRS-UL-Config: SoundingRS uplink configuration information.

uplinkPowerControl: uplink power control.

ul-CyclicPrefixLength: uplink cyclic prefix length.

If the component carrier to be added is for downlink transmission, SIB2 may include:

mbsfn-SubframeConfigList: the subframe list reserved for MBSFN (Multimedia Broadcast multicast service Single Frequency Network) of downlink.

bcch-Config: BCCH channel configuration information.

pcch-Config: PCCH (Paging Control Channel) channel configuration information.

pdsch-Config: PDSCH (Physical downlink shared channel) channel configuration information.

Of course, the above system information is merely an example, and the disclosure is not limited to this. In addition, when using a dedicated signaling, the system information may be transferred in the format of an increment signaling. For example, the related information of the first cell may be used as default information, and in this case, the update of the related information may be identified with an on flag "ON". For example, when the on flag "ON" is 1, it means that there is update in the related information; and when the flag "ON" is 0, it means that there is no update in the related information. When receiving the system information transmitted via an increment signaling, the user equipment may determine which part's the system information is updated.

The second dedicated signaling and the third dedicated signaling both can be transmitted in the format of an increment signaling. When the system information or the updated system information is sent via a dedicated signaling, the signaling may also adopt the format of an increment signaling. For example, when being transmitted by using a dedicated signaling, the updated system information may include only the part of system information related to the change, while the other information that is irrelevant to the change is excluded. For another example, the second dedicated signaling may include only the system information that is related to the component carrier to be added or to the carrier segment and that affects the CA transmission.

Figure 37:
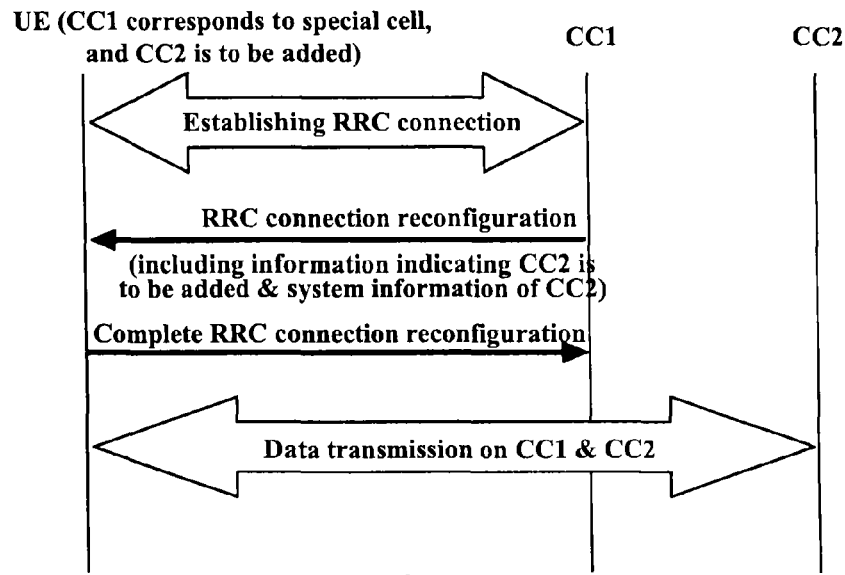
FIG. 37 is a schematic diagram illustrating a user equipment obtaining updated system information when a component carrier is to be added under a CA supporting scenario.

FIG. 37 is a schematic diagram showing the process of obtaining the updated system information by the user equipment when a component carrier is added under carrier aggregation scenario (i.e. obtaining the system information related to the component carrier to be added). As shown in FIG. 37, it is supposed that the cell corresponding to the component carrier CC1 of the user equipment UE is the first cell (the special cell) of the user equipment and that a component carrier CC2 is to be added for the user equipment. Firstly, the user equipment establishes an RRC (Radio Resource Control) connection with CC1 (the special cell) (the RRC connection can be established by using any appropriate method, the description of which is omitted). The system information of the component carrier CC2 to be added may be carried by using the extension of the RRC-ConnectionReconfiguration message. The user equipment may obtain the message via the cell corresponding to CC 1. Then the user equipment may activate the component carrier CC2 by using the system information contained in the message. By using this method, the CA transmission may be facilitated.

Extension Carrier

An extension carrier is a carrier that can not be used independently; it belongs to a set of component carriers which includes at least one carrier that can be used independently. The extension carrier has to co-exist with a carrier that can be used independently. Generally the extension carrier is not used to transfer the system information. When an extension carrier is to be added to a currently used component carrier, the related system information may be transferred by using the transmitting and receiving methods as shown in FIG. 27 and FIG. 28.

Further, the channel configuration of the extension carrier may be different from that of other types of carriers. For example, an extension carrier does not contain RACH, PDCCH, and PDCCH channels, and the like. Thus, when transmitting the system information in SIB2, such information can be omitted. In this way, the amount of transmitted information can be further reduced.

By using the method as shown in FIG. 27 and FIG. 28 to transmit and receive the system information related to the extension carrier by using the dedicated signaling of the first cell, the overhead for listening to the broadcast channel can be avoided.

As described above, the change of the system information may include the case of adding an extension carrier. In other words, the methods shown in FIGS. 2-26 and the apparatuses and systems shown in FIGS. 31-36 to be described below may also be applied to transmit and receive the system information related to the extension carrier, the description of which is not repeated here.

Carrier Segment

A carrier segment can be considered as a backward compatible data transmission extension on component carrier, in which some consecutive resources blocks are attached to a backward compatible component carrier so that the resulted component carrier can be used a backward incompatible component carrier to be sued by the LTE-A user equipment.

The methods of providing and receiving the system information shown in FIGS. 27-28 may be applied to the case that the component carrier to be added contains a carrier segment.

The methods of providing and receiving the system information and the methods of updating the system information shown in FIG. 2 to FIG. 26 each can be applied to the case of attaching a carrier segment to a currently used (activated) component carrier. As an example, in such case, the first information/the notification information may include information indicating the carrier segment to be added. As another example, the carrier segment to be added to the currently used component carrier may be expressed by an indicator (also referred to the third indicator, e.g. CarrierSegmentIndicator). If a CA-NS user equipment receives the information transmitted from the base station, it may judge whether to accept the system information based on the third indicator. If the third indicator indicates that a carrier segment is to be added, the CA-NS user equipment will not accept the system information. That is, the scenario of adding a carrier segment will not affects the CA-NS user equipments.

In an example, if the method shown in FIG. 11, FIG. 13, or FIG. 15 is used to add a carrier segment to a currently used component carrier (i.e. transmitting the first information/the notification information via the first cell by using a dedicated signaling and transmitting configuration information related to the carrier segment via the broadcast channel of the corresponding cell, i.e. the cell corresponding to the component carrier to which the carrier segment is to be added), the base station may encapsulate the first information or the notification information containing the third indicator in the first dedicated signaling in which the third indicator is set as valid. In the broadcast channel of the corresponding cell, the system information related to the carrier segment is broadcast via the second broadcast signaling. However, no update notification is added in the second broadcast signaling, so as to be compatible with LTE Release 8. For a user equipment which does not support LTE-A, the change of the system information is transparent. That is, if a user equipment does not support LTE-A, it will not receive the first dedicated signaling and will not listen to the broadcast channel of the corresponding cell on which the updated system information is transferred. After a user equipment supporting LTE-A receives the first information or notification information and determines that the third indicator is valid, it begins to listen to the broadcast channel of the corresponding, to receive the updated system information.

In another example, if the method shown in FIG. 12, FIG. 14, or FIG. 15 is used to add a carrier segment to a currently used component carrier (i.e. transmitting the first information/the notification information via the broadcast channel of the first cell and transmitting configuration information related to the carrier segment via the broadcast channel of the corresponding cell, i.e. the cell corresponding to the component carrier to which the carrier segment is to be added), the base station may encapsulate the first information or the notification information containing the third indicator in the first broadcast signaling in which the third indicator is set as valid. In the broadcast channel of the corresponding cell, the updated system information, i.e. the system information related to the carrier segment, is broadcast via the second broadcast signaling. If a user equipment does not support LTE-A, it will not listen to the broadcast channel of the corresponding cell on which the updated system information is transferred (or ignore the broadcast updated system information) after it receives the first information or the notification information and determines that the third indicator is valid. After a user equipment supporting LTE-A receives the first information or notification information and determines that the third indicator is valid, it begins to listen to the broadcast channel of the corresponding, to receive the updated system information FIG. 29 shows a method of providing the system information related to a carrier segment in the case that the carrier segment is to be attached to a currently used component carrier according to another embodiment of the disclosure. In the method of FIG. 29, the related system information is transmitted to the user equipment directly via the cell corresponding to the currently used component carrier.

As shown in FIG. 29, in step S2902, when adding a carrier segment to the currently used component carrier, the system information related to the carrier segment is generated, and the information indicating that a carrier segment is to be added may also be generated. Particularly, the system information may be obtained from corresponding configuration file by the base station of the communication system. In step S2904, the generated information is sent via the cell corresponding to the currently used component carrier. As an example, the system information can be encapsulated in a dedicated signaling (also called as the fourth dedicated signaling), and the fourth dedicated signaling is transmitted via the dedicated channel of the cell. As another example, the system information can be encapsulated in a broadcast signaling (also called as the third broadcast signaling), and the third broadcast signaling is transmitted via the broadcast channel of the cell.

FIG. 30 shows a method of receiving the system information related to the carrier segment when adding the carrier segment to the currently used component carrier, which corresponds to the transmitting process shown FIG. 29. As shown in FIG. 30, in step S3003 the user equipment receives the system information related to the carrier segment and the information indicating that the carrier segment is to be added via the cell corresponding to the currently used component carrier. In step S3005, the user equipment configures the carrier segment based on the system information, to activate the carrier segment. In the case that the system information is encapsulated in the fourth dedicated signaling, the user equipment receives the fourth dedicated signaling via the dedicated channel of the cell, parses the fourth dedicated signaling to obtain the system information, and configures the carrier segment based on the system information. In the case that the system information is encapsulated in the third broadcast signaling, the user equipment receives the third broadcast signaling by listening to the broadcast channel of the cell, parses the third broadcast signaling to obtain the system information, and configures the carrier segment based on the system information.

The transmitting method shown in FIG. 29 and the receiving method shown in FIG. 30 may also be used to add an extension carrier to a currently used component carrier, the description of which is not repeated here.

FIG. 31 shows an apparatus of providing the system information in the CA-S communication system according to an embodiment of the disclosure. As shown in FIG. 31, the apparatus includes: an information generated device 3102, a cell determining device 3104 and a transmitting device 3106.

The information generated device 3102 may generate the first information when the system information of the communication system changes. The first information contains information that the system information changes. The related information can be obtained from the corresponding configuration file in the base station of the communication system, to determine whether the system information changes or not.

The cell determining device 3104 may determines the first cell of a user equipment involved in the change of the system information. The first cell is one of the cells to which the user equipment is connected, and corresponds to a component carrier which is being used by the user equipment and is kept in connection with the base station of the communication system. The first cell (the special cell) is the same as described above, the description of which is not repeated here. The cell determining device 3104 may determine the special cell of the user equipment by using the above method, the description of which is not repeated here.

The transmitting device 3106 may transmit the first information to the user equipment via the first cell.

The above apparatus may be configured at the network side of the communication system, for example may be configured in the base station of the communication system. In the CA-S communication system, the first cell always keeps in connection with the main node (e.g. the base station) of the communication system. Thus, by using the above apparatus, the case that the user equipment can not receive the updated system information can be avoided, so that the system information can be updated or provided in time. In addition, the base station needs not to transmit the system information or notify the update of the system information via each of the cells supported by the user equipment, thereby decreasing the signaling load of the whole system.

In an example, the information generated device 3102 may be further configured to encapsulate the first information in a dedicated signaling (the first dedicated signaling), and the transmitting device 3106 may transmit the first dedicated signaling to the user equipment via the first cell, i.e. via the dedicated channel of the first cell.

In another example, the information generated device 3102 may be further configured to encapsulate the first information in a broadcast signaling (the first broadcast signaling) and the transmitting device 3106 may transmit the first broadcast signaling to the user equipment via the broadcast channel of the first cell.

FIG. 32 shows an apparatus of receiving the system information in the CA-S communication system according to an embodiment of the disclosure. As shown in FIG. 32, the apparatus includes: a receiving device 3203 and a control device 3205.

The receiving device 3203 may receive the first information containing the information indicating that the system information changes via the first cell.

The control device 3205 parses the first information to obtain the information indicating that the system information changes.

The apparatus of receiving the system information may be configured in the user equipment of the communication system. With apparatus of receiving the system information, the user equipment can know the change of the system information in time. Since the first cell (the special cell) is always connected to the base station, the case that the information can not be received is avoided. In addition, the user equipment needs not to listen to all the cells corresponding to all of its supportable component carriers, by which the power consumption of the user equipment can be reduced significantly and the life time of the battery of the user equipment can be lengthened.

In the case that the first information is encapsulated in the first dedicated signaling, the receiving device 3203 may be configured to: receive the first dedicated signaling containing the first information via the first cell, i.e. via the dedicated channel of the first cell.

In the case that the first information is encapsulated in the first broadcast signaling, the receiving device 3203 may receive the first broadcast signaling containing the first information via the broadcast channel of the first cell, e.g. by listening to the broadcast channel of the first cell.

According to an embodiment, a CA-S communication system may include the above apparatus of providing the system information and the apparatus of receiving the system information, for transferring and updating the system information.

Similar to the methods shown in FIG. 2 to FIG. 8, the first information may include only the information indicating that the system information changes (also called as the notification information). The apparatuses of transmitting and receiving the same are described below with reference to FIG. 33 and FIG. 34.

As another embodiment, the first information generated by the information generated device 3102 may also include the updated system information, and the transmitting device 3106 may transmit the first information containing the updated system information to the user equipment via the first cell (e.g. by the first broadcast signaling or the first dedicated signaling). And at the side of the user equipment, the control device 3205 parses the first information to obtain the updated system information. As an example, the first information may also include the information indicating whether the change of the system information affects the CA transmission (also called as the third information). For example, the third information may indicate the system information of which part(s) of the communication system changes and the user equipment (the control device) may determine whether the CA transmission is affected by this information.

As another embodiment, the change of the system information may include the case of adding a carrier segment and/or an extension carrier to a currently used component carrier. In this case, the first information may include the system information related to the carrier segment and/or the extension carrier. When the receiving device 3203 receives the first information via the first cell (e.g. by the first broadcast signaling or the first dedicated signaling), the control device 3205 parses the first information to know that the carrier segment and/or the extension carrier is to be added and to obtain the system information related to the carrier segment and/or the extension carrier, and then configure the carrier segment and/or the extension carrier based on the system information.

Figure 33:
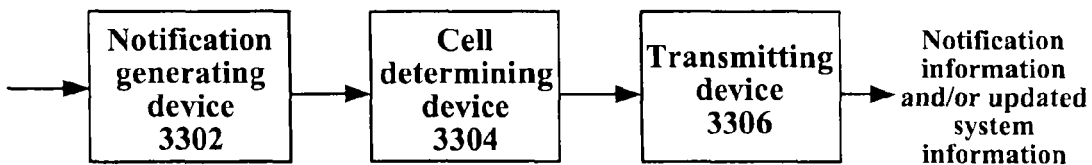
FIG. 33 is a schematic block diagram illustrating an apparatus of notifying update of system information in a CA-S communication system according to an embodiment of the disclosure.

FIG. 33 shows an apparatus of notifying update of the system information in a CA-S communication system according to an embodiment of the disclosure. As shown in FIG. 33, the apparatus includes: a notification generating device 3302, a cell determining device 3304 and a transmitting device 3306.

The notification generating device 3302 may generate the notification information indicating that the system information changes when the system information of the communication system changes. The notification information is an example of the first information.

The cell determining device 3304 determines the first cell of a user equipment involved in the change of the system information. The first cell is one of the cells to which the user equipment is connected, and corresponds to a component carrier which is being used by the user equipment and is kept in connection with the base station of the communication system. The first cell (the special cell) is the same as described above, the description of which is not repeated here. The cell determining device 3104 may determine the special cell of the user equipment by using the above method, the description of which is not repeated here. The cell determining device 3304 may determine the special cell of the user equipment by using any of the above described method, the description of which is not repeated here.

The transmitting device 3306 may transmit to the user equipment the notification information via the first cell.

In an example, the notification generating device 3302 may encapsulate the notification information in a dedicated signaling (the first dedicated signaling), and the transmitting device 3306 transmits the first dedicated signaling to the user equipment via the first cell, via the dedicated channel of the first cell. In another example, the notification generating device 3302 may encapsulate the notification information in a broadcast signaling (the first broadcast signaling), and the transmitting device 3306 transmits the first broadcast signaling to the user equipment via the broadcast channel of the first cell.

Figure 34:
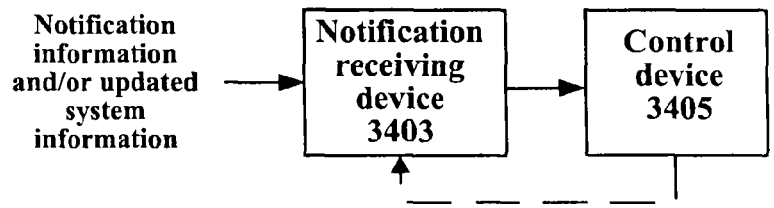
FIG. 34 is a schematic block diagram illustrating an apparatus of receiving the notification of system information update in a CA-S communication system according to an embodiment of the disclosure.

FIG. 34 shows an apparatus of receiving the notification of update of the system information in a CA-S communication system according to an embodiment of the disclosure. As shown in FIG. 34, the apparatus includes: a notification receiving device 340 and a control device 3405.

The notification receiving device 3403 receives via the first cell the notification information transmitted from the network side of the communication system (the base station). The notification information contains information indicating that the system information changes.

The control device 3405 parses the notification information to get aware that the system information of the communication system changes.

The apparatus of receiving the notification may be configured in the user equipment of the communication system. With the apparatus, the user equipment can get the notification of the change of the system information in time. Since the first cell (the special cell) is always connected to the base station, the case that the information can not be received is avoided. In addition, the user equipment needs not to listen to all the cells corresponding to all of its supportable component carriers, by which the power consumption of the user equipment can be reduced significantly and the life time of the battery of the user equipment can be lengthened.

If the notification information is encapsulated in the first dedicated signaling, the receiving device 3403 may be configured to: receive the first dedicated signaling containing the notification information via the first cell, i.e. via the dedicated channel of the first cell.

In the case that the notificationinformation is encapsulated in the first broadcast signaling, the receiving device 3403 may receive the first broadcast signaling containing the notification information via the broadcast channel of the first cell, e.g. by listening to the broadcast channel of the first cell.

In an example, the notification generating device 3302 may encapsulate the updated system information in a broadcast signaling (the second broadcast signaling), and the transmitting device 3306 may transmit the second broadcast signaling to the user equipment via the broadcast channel of the cell (the second cell) corresponding to the component carrier involved in the change of the system information. In this case, at the side of the user equipment, the control device 3405 parses the notification information to know the change of the system information, and indicates the receiving device 3403 to listen to the broadcast channels of all the cells corresponding to all of the component carriers supported by the user equipment, to receive the updated system information transmitted from the network side (the base station) of the communication system.

As another example, the notification information generated by the notification generating device 3302 may further include the information for identifying a component carrier involved in the change of the system information (the second information). When the receiving device 3403 of the user equipment receives the notification information containing the second information, the control device 3405 parses the notification information to obtain the second information to know the component carrier involved in the change of the system information based on the second information, and then instructs the receiving device 3403 to listen to the broadcast channel of the cell corresponding to this component carrier to receive the updated system information. Thus the user equipment needs not to listen to all the cells, by which the power consumption of the user equipment can be reduced and the life time of the battery of the user equipment can be lengthened.

As another example, the notification information generated by the notification generating device 3302 may further include information (the third information) for identifying whether the change of the system information affects the CA transmission. When the receiving device 3403 of the user equipment receives the notification information containing the third information, the control device 3405 parses the notification information to obtain the third information, and based on the third information, decides whether to receive the updated system information. For example, if the user equipment supports CA and the third information indicates that the change of the system information does not affect CA transmission, the control device 3405 may choose to not receive the updated system information, and i.e. it does not instruct the receiving device 3403 to receive the updated system information. If the user equipment does not support CA and the third information indicates that the change of the system information affects the CA transmission, the user equipment chooses to not receive the updated system information. If the control device 3405 determines that the change of the system information affects the CA transmission based on the third information and decides to receive the updated system information, it instructs the receiving device 3403 to listen to the corresponding cell to receive the updated system information.

As another example, the notification generating device 3302 may encapsulate the updated system information in a dedicated signaling (also called as the third dedicated signaling) and the signaling may be transmitted and received via the dedicated channel of the second cell. In the embodiment, the notification information includes the information (the second information) for identifying the component carrier involved in the change of the system information. When the receiving device 3403 of the user equipment receives the notification information containing the second information, the control device 3405 parses the notification information to obtain the second information, and based on the second information, instructs the receiving device 3403 to listen to the dedicated channel of the cell corresponding to this component carrier, so as to receive the updated system information. In the embodiment, the user equipment needs not to listen to other cells corresponding to the other component carriers supported by it, by which the power consumption of the user equipment can be reduced and the life time of the battery of the user equipment can be lengthened.

Similar to the above method embodiments, the broadcast signaling and/or the dedicated signaling may be newly defined signaling, or may be extension to known signaling, the description of which are omitted herein.

According to an embodiment, a CA-S communication system may include the above apparatus of notifying the update of the system information and the apparatus of receiving the notification of the update of the system information, for notifying the update of the system information.

Figure 35:
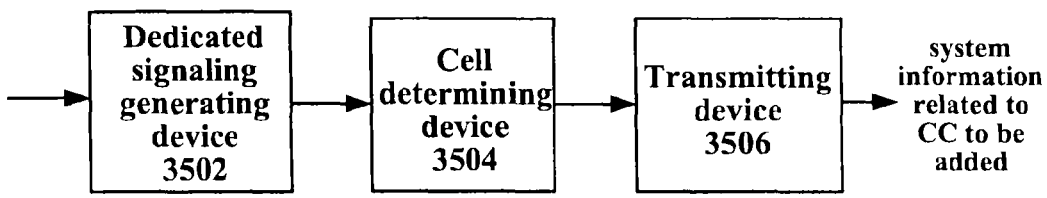
FIG. 35 is a schematic block diagram illustrating an apparatus of providing system information when a component carrier is to be added according to an embodiment of the disclosure.

FIG. 35 shows an apparatus of transmitting the system information when adding a component carrier according to an embodiment of the disclosure. As shown in FIG. 35, the apparatus includes: a dedicated signaling generating device 3502, a cell determining device 3504 and a transmitting device 3506.

The dedicated signaling generating device 3502 may generate the first information when a component carrier is to added, the first information includes the information indicating that the component carrier is to be added and the system information related to the component carrier to be added. The dedicated signaling generating device 3502 may be configured to encapsulate the first information in the second dedicated signaling.

The cell determining device 3504 may determine the first cell of the user equipment involved in the change of the system information. The first cell (the special cell) is the same as described above, the description of which is not repeated here. The cell determining device 3104 may determine the special cell of the user equipment by using the above method, the description of which is not repeated here. The cell determining device 3304 may determine the special cell of the user equipment by using any of the above described method, the description of which is not repeated here. The cell determining device 3504 may determine the special cell of the user equipment by using any of the above described methods, the description of which is not repeated here.

The transmitting device 3506 transmits the second dedicated signaling to the user equipment via the first cell, via the dedicated channel of the first cell.

Figure 36:
FIG. 36 is a schematic block diagram illustrating an apparatus of receiving system information when a component carrier is to be added according to an embodiment of the disclosure.

FIG. 36 shows an apparatus of receiving the system information when a component carrier is to be added, which corresponds to the apparatus of providing the system information shown in FIG. 35. As shown in FIG. 36, the apparatus includes: a dedicated signaling receiving device 3603 and a control device 3605.

The signaling receiving device 3603 may be configured to receive the second dedicated signaling containing the first information which includes the system information related to the component carrier to be added via the first cell. The control device 3605 is configured to parse the second dedicated signaling to know that the component carrier is to be added and to obtain the system information related to the component carrier, and then configure the component carrier based on the system information related to this component carrier.

Since the system information is transmitted via the first cell by using the dedicated signaling, the user equipment needs not to listen to the broadcast channels of all the cells. In addition, by using the dedicated signaling, such information becomes transparent to those CA-NS user equipments.

In an example, the component carrier to be added may be an extension carrier, and the first information generated by the dedicated signaling generating device 3502 may further include the system information related to the extension carrier. Accordingly, when the signaling receiving device 3603 receives the second dedicated signaling containing the first information, the control device 3605 parses the second dedicated signaling to know the extension carrier to be added and to obtain the system information related to the extension carrier, and configures the extension carrier based on the information.

In another example, the component carrier to be added may include a carrier segment to be attached to the component carrier. The dedicated signaling generating device 3502 is further configured to generate the system information related to the carrier segment, and the transmitting device 3506 is further configured to transmit the system information related to the carrier segment to the user equipment via the first cell. For example, the system information related to the carrier segment may be capsulated in the second dedicated signaling. Accordingly, when the signaling receiving device 3603 receives the second dedicated signaling containing the first information, the control device 3605 parses the signaling to obtain the first information to know the carrier segment is to be added and to obtain the system information related to the carrier segment, and configures the carrier segment based on the information.

According to an embodiment, a CA-S communication system may include the above apparatuses of providing and receiving the system information, to transmit the system information in the case a component carrier is added.

The system information and the second dedicated signaling may have similar formats and transmission manners as described above with reference to FIG. 27 and FIG. 28, the description of which is not repeated here.

In some embodiments or examples, dedicated signaling is used during transmission of the system information, and only important system information (e.g. the updated system information or important information related to carrier aggregation, or the like) is transmitted, by which the starting of the CA transmission is accelerated.

In some embodiments or examples, during transmission of the system information, system information update notification message is transmitted by using a cell (e.g. the special cell) corresponding to a certain component carrier, by which the receipt accuracy of the system update notification message is improved, the energy consumption of the user equipment and monitoring load is lowered, and the life time of the battery of the user equipment is lengthened.

It should be understood that the above embodiments and examples are illustrative, rather than exhaustive. The present disclosure should not be regarded as being limited to any particular embodiments or examples stated above.

In the above embodiments and examples, the expressions, such as "the first", "the second", and "the third" (e.g. the first dedicated signaling, and the second dedicated signaling, and the like), are used. Those skilled in the art will appreciate that such expressions are used merely to differentiate the terms in literal, and should not be considered as defining the sequence or the like of the terms.

As an example, the components, units or steps in the above apparatuses and methods can be configured with software, hardware, firmware or any combination thereof in the main node (e.g. the base station) of the communication network, as part of the radio resource control apparatus of the base station. The components, units or steps in the above resource allocating apparatuses and methods can be configured with software, hardware, firmware or any combination thereof by using any appropriate means or manners known in the art, the description of which is not detailed herein.

As an example, the above apparatuses and methods can be realized in an existing radio resource control apparatus of the base station by modifying the components of the existing radio resource control apparatus.

Figure 38:
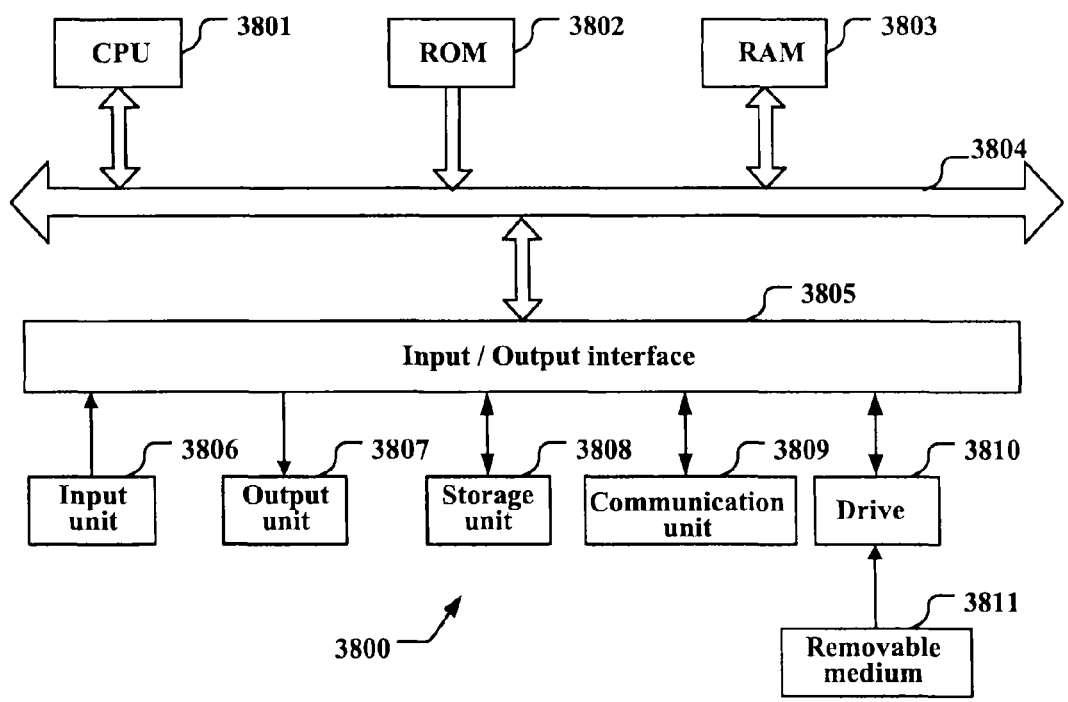
FIG. 38 is a schematic block diagram illustrating the structure of a computer for realizing embodiment or example of the disclosure.

As an example, in the case of using software or firmware, programs constituting the software for realizing the above method or apparatus can be installed to a computer with a specialized hardware structure (e.g. the general purposed computer 3800 as shown in FIG. 38) from a storage medium or a network. The computer, when installed with various programs, is capable of carrying out various functions.

In FIG. 38, a central processing unit (CPU) 3801 executes various types of processing in accordance with programs stored in a read-only memory (ROM) 3802, or programs loaded from a storage unit 3808 into a random access memory (RAM) 3803. The RAM 3803 also stores the data required for the CPU 3801 to execute various types of processing, as required. The CPU 3801, the ROM 3802, and the RAM 3803 are connected to one another through a bus 3804. The bus 3804 is also connected to an input/output interface 3805.

The input/output interface 3805 is connected to an input unit 3806 composed of a keyboard, a mouse, etc., an output unit 3807 composed of a cathode ray tube or a liquid crystal display, a speaker, etc., the storage unit 3808, which includes a hard disk, and a communication unit 3809 composed of a modem, a terminal adapter, etc. The communication unit 3809 performs communicating processing. A drive 3810 is connected to the input/output interface 3805, if needed. In the drive 3810, for example, removable media 3811 is loaded as a recording medium containing a program of the present invention. The program is read from the removable media 3811 and is installed into the storage unit 3808, as required.

In the case of using software to realize the above consecutive processing, the programs constituting the software may be installed from a network such as Internet or a storage medium such as the removable media 3811.

Those skilled in the art should understand the storage medium is not limited to the removable media 3811, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 3802 or the hard disc involved in the storage unit 3808, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separately. For example, in some embodiments the step of determining the first cell may be performed before the step of generating the first information or the notification information. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

The invention claimed is:

1. An electronic device, comprising:
circuitry, configured to
generate first information comprising updated system information of a dependent carrier;
determine a first cell of a user equipment involved in a change of system information of the dependent carrier, wherein the first cell is connected to the user equipment, and the first cell is configured to provide security input and Non Access Stratum mobility information to the user equipment;
allocate the first information to a dedicated channel for the user equipment;
include the first information in a single Radio Resource Control (RRC) connection reconfiguration message; and
control transmission, to the user equipment, of the first information included in the RRC connection reconfiguration message in the dedicated channel via the determined first cell associated with an independent carrier which is being used by the user equipment to keep in connection with the electronic device, wherein
the dependent carrier has fewer channels than the independent carrier and the dependent carrier is aggregated with the independent carrier for transmission,
the first information indicates the change of the system information of the dependent carrier, the dependent carrier being associated with a second cell that also communicates with the user equipment while the first cell is communicating with the user equipment to increase a communication channel capacity of the user equipment, and
the updated system information of the dependent carrier comprises configuration information on downlink transmission bandwidth and information indicating downlink carrier frequency of the dependent carrier.

2. The electronic device according to claim 1, wherein the dependent carrier doesn't include at least one of random access channel and control channel.

3. The electronic device according to claim 1, wherein the electronic device is a base station, and the electronic device further comprises
transmitting circuitry, configured to transmit the first information to the user equipment via the independent carrier to inform the user equipment of the updated system information.

4. The electronic device according to claim 1, wherein the first information comprises identification information of another cell associated with the dependent carrier to indicate a change of system information of the dependent carrier.

5. The electronic device according to claim 1, wherein the dependent carrier doesn't include random access channel and the updated system information doesn't include system information relevant to random access channel.

6. The electronic device according to claim 1, wherein the circuitry is configured to control transmission of the first information only via the first cell to the user equipment.

7. The electronic device according to claim 1, wherein the updated system information includes configuration information of at least one of Physical hybrid-ARQ indicator channel (PHICH), Physical downlink shared channel (PDSCH), mbsfn-SubframeConfigList, uplinkPowerControl, soundingRS-UL-Config, ul-CyclicPrefixLength and pusch-Config.

8. An electronic device, comprising
circuitry, configured to
control receiving, from another electronic device, first information in a dedicated channel via a first cell associated with an independent carrier which is being used by the electronic device to keep in connection with a base station, wherein the first cell is determined by the another electronic device as a cell of the electronic device involved in a change of system information of a dependent carrier, the first cell is connected to the electronic device, and the first cell is configured to provide security input and Non Access Stratum mobility information to the electronic device;
parse the first information to obtain updated system information of the dependent carrier,
wherein the dependent carrier has fewer channels than the independent carrier and the dependent carrier is aggregated with the independent carrier for transmission,
the first information indicates the change of the system information of the dependent carrier, the dependent carrier being associated with a second cell that also communicates with the electronic device while the first cell is communicating with the electronic device to increase a communication channel capacity of the electronic device, and
the updated system information of the dependent carrier comprises configuration, information on downlink transmission bandwidth and information indicating downlink carrier frequency of the dependent carrier.

9. The electronic device according to claim 8, wherein the dependent carrier doesn't include at least one of random access channel and control channel.

10. The electronic device according to claim 8, wherein the electronic device is user equipment, and the electronic device further comprises
receiving circuitry, configured to receive the first information from the base station via the independent carrier for the updated system information.

11. The electronic device according to claim 8, wherein the first information comprises identification information of another cell associated with the dependent carrier to indicate a change of system information of the dependent carrier.

12. The electronic device according to claim 8, wherein the dependent carrier doesn't include random access channel and the updated system information doesn't include system information relevant to random access channel.

13. The electronic device according to claim 8, wherein the circuitry is configured to control receiving the first information only via the first cell from the base station.

14. The electronic device according to claim 8, wherein the updated system information includes configuration information of at least one of Physical hybrid-ARQ indicator channel (PHICH), Physical downlink shared channel (PDSCH), mbsfn-SubframeConfigList, uplinkPowerControl, soundingRS-UL-Config, ul-CyclicPrefixLength and pusch-Config.

15. A communication method of an electronic device, comprising
generating first information comprising updated system information of a dependent carrier;

determining, using circuitry, a first cell of a user equipment involved in a change of system information of the dependent carrier, wherein the first cell is connected to the user equipment, and the first cell is configured to provide security input and Non Access Stratum mobility information to the user equipment;

allocating the first information to a dedicated channel for the user equipment;

including the first information in a single Radio Resource Control (RRC) connection reconfiguration message; and controlling transmission, to the user equipment, of the first information included in the RRC connection reconfiguration message in the dedicated channel via the determined first cell associated with an independent carrier which is being used by the user equipment to keep in connection With the electronic device, wherein the dependent carrier has fewer channels than the independent carrier and the dependent carrier is aggregated with the independent carrier for transmission, the first information indicates the change of the system information of the dependent carrier, the dependent carrier being associated with a second cell that also communicates with the user equipment while the first cell is communicating with the user equipment to increase a communication channel capacity of the user equipment, and the updated system information of the dependent carrier comprises configuration information on downlink transmission bandwidth and information indicating downlink carrier frequency of the dependent carrier.

16. A communication method of an electronic device, comprising controlling receiving, from another electronic device, first information in a dedicated channel via a first cell associated with an independent carrier which is being used by the electronic device to keep in connection with a base station, wherein the first cell is determined by the another electronic device as a cell of the electronic device involved in a change of system information of a dependent carrier, the first cell is connected to the electronic device, and the first cell is configured to provide security input and Non Access Stratum mobility information to the electronic device;

parsing, using circuitry, the first information to obtain updated system information of the dependent carrier, wherein the dependent carrier has fewer channels than the independent carrier and the dependent carrier is aggregated with the independent carrier for transmission, the first information indicates the change of the system information of the dependent carrier, the dependent carrier being associated with a second cell that also communicates with the electronic device while the first cell is communicating with the electronic device to increase a communication channel capacity of the electronic device, and the updated system information of the dependent carrier comprises configuration information on downlink transmission bandwidth and information indicating downlink carrier frequency of the dependent carrier.

17. A non-transitory computer readable storage medium including executable instructions, which when executed by a computer cause the computer to execute a communication method for an electronic device, the method comprising:

generating first information comprising updated system information of a dependent carrier;

determining a first cell of a user equipment involved in a change of system information of the dependent carrier, wherein the first cell is connected to the user equipment, and the first cell is configured to provide security input and Non Access Stratum mobility information to the user equipment;

allocating the first information to a dedicated channel for the user equipment;

including the first information in a single Radio Resource Control (RRC) connection reconfiguration message; and controlling transmission, to the user equipment, of the first information included in the RRC connection reconfiguration message in the dedicated channel via the determined first cell associated with an independent carrier which is being used by the user equipment to keep in connection with the electronic device, wherein the dependent carrier has fewer channels than the independent carrier and the dependent carrier is aggregated with the independent carrier for transmission, the first information indicates the change of the system information of the dependent carrier, the dependent carrier being associated with a second cell that also communicates with the user equipment while the first cell is communicating with the user equipment to increase a communication channel capacity of the user equipment, and the updated system information of the dependent carrier comprises configuration information on downlink transmission bandwidth and information indicating downlink carrier frequency of the dependent carrier.

18. A non-transitory computer readable storage medium including executable instructions, which when executed by a computer cause the computer to execute a communication method for an electronic device, the method comprising:

controlling receiving, from another electronic device, first information in a dedicated channel via a tint cell associated with an independent carrier which is being used by the electronic device to keep in connection with a base station, wherein the first cell is determined by the another electronic device as a cell of the electronic device involved in a change of system information of a dependent carrier, the first cell is connected to the electronic device, and the first cell is configured to provide security input and Non Access Stratum mobility information to the electronic device;

parsing the first information to obtain updated system information of the dependent carrier, wherein the dependent carrier has fewer channels than the independent carrier and the dependent carrier is aggregated with the independent carrier for transmission, the first information indicates the change of the system information of the dependent carrier, the dependent carrier being associated with a second cell that also communicates with the electronic device while the first cell is communicating with the electronic device to increase a communication channel capacity of the electronic device, and the updated system information of the dependent carrier comprises configuration information on downlink transmission bandwidth and information indicating downlink carrier frequency of the dependent carrier.

* * * * *